US012711414B2

(12) United States Patent
Griffin et al.

(10) Patent No.: US 12,711,414 B2
(45) Date of Patent: Aug. 18, 2026

(54) MIGRATING EXECUTING QUANTUM PROCESSES INTO QUANTUM ISOLATION ZONES (QIZs)

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1240 days.

(21) Appl. No.: 17/587,000

(22) Filed: Jan. 28, 2022

(65) Prior Publication Data

US 2023/0244521 A1 Aug. 3, 2023

(51) Int. Cl.
*G06N 10/80* (2022.01)

(52) U.S. Cl.
CPC .................................. *G06N 10/80* (2022.01)

(58) Field of Classification Search
CPC .................................................... G06N 10/80
See application file for complete search history.

(56) References Cited

U.S. PATENT DOCUMENTS 7,788,192 B2 8/2010 Amin
9,384,054 B2 7/2016 Uola et al.
9,405,551 B2 8/2016 Yamada et al.
9,858,531 B1 1/2018 Monroe et al.
10,325,218 B1 * 6/2019 Zeng ...................... G06N 10/00
2020/0116784 A1 4/2020 Liu et al.
2022/0164253 A1 * 5/2022 On ......................... G06N 10/80

OTHER PUBLICATIONS

Han, K.-H et al., "Parallel Quantum-inspired Genetic Algorithm for Combinatorial Optimization Problem," Proceedings of the 2001 Congress on Evolutionary Computation (IEEE Cat. No.01TH8546), May 27-30, 2001, Seoul, South Korea, IEEE, pp. 1422-1429.

Rajakumar, J. et al., "Generating Target Graph Couplings for QAOA from Native Quantum Hardware Couplings," arXiv:2011.08165v1 [quant-ph], Nov. 16, 2020, 12 pages.

Riesebos, L. et al., "Universal Graph-Based Scheduling for Quantum Systems," IEEE Micro, vol. 41, Issue 5, Jul. 7, 2021, IEEE, pp. 57-65.

* cited by examiner

*Primary Examiner* — Shahid K Khan
(74) *Attorney, Agent, or Firm* — Dority & Manning, P.A.

(57) ABSTRACT

Migrating executing quantum processes into Quantum Isolation Zones (QIZs) is disclosed herein. In one example, a processor device of a quantum computing device determines to migrate a quantum process currently executing using a first one or more qubits on the quantum computing device into a first QIZ, wherein the first QIZ limits qubit visibility of any quantum process associated with the first QIZ to a plurality of qubits associated with the first QIZ. Upon determining to migrate the quantum process, the processor device transfers the first one or more qubits to the first QIZ and associates the quantum process with the first QIZ. The processor device then continues execution of the quantum process within the first QIZ.

17 Claims, 22 Drawing Sheets

| QID | SAS | QIZID | QIZAS | PROC | PAR | CHLD | MD |
|---|---|---|---|---|---|---|---|
| Q1 | NA | Z1 | NA | PA | NULL | NULL | XXX |
| Q2 | NA | Z1 | NA | PA | NULL | NULL | XXX |
| Q3 | NA | Z1 | NA | PB | NULL | NULL | XXX |
| Q4 | NA | Z1 | A | NULL | NULL | NULL | XXX |
| Q5 | NA | Z1 | A | NULL | NULL | NULL | XXX |
| Q6 | NA | Z1 | A | NULL | NULL | NULL | XXX |
| Q7 | A | NULL | NULL | NULL | NULL | NULL | XXX |
| Q8 | A | NULL | NULL | NULL | NULL | NULL | XXX |
| Q9 | A | NULL | NULL | NULL | NULL | NULL | XXX |
| Q10 | A | NULL | NULL | NULL | NULL | NULL | XXX |
| Q11 | A | NULL | NULL | NULL | NULL | NULL | XXX |
| Q12 | A | NULL | NULL | NULL | NULL | NULL | XXX |

| QID | SAS | QIZID | QIZAS | PROC | PAR | CHLD | MD |
|---|---|---|---|---|---|---|---|
| Q1 | NA | Z1 | A | NULL | NULL | NULL | XXX |
| Q2 | NA | Z1 | A | NULL | NULL | NULL | XXX |
| Q3 | NA | Z1 | A | NULL | NULL | NULL | XXX |
| Q4 | NA | Z1 | A | NULL | NULL | NULL | XXX |
| Q5 | NA | Z1 | A | NULL | NULL | NULL | XXX |
| Q6 | NA | Z1 | A | NULL | NULL | NULL | XXX |
| Q7 | NA | Z1 | NA | PF | NULL | NULL | XXX |
| Q8 | NA | Z1 | NA | PF | NULL | NULL | XXX |
| Q9 | A | NULL | NULL | NULL | NULL | NULL | XXX |
| Q10 | A | NULL | NULL | NULL | NULL | NULL | XXX |
| Q11 | A | NULL | NULL | NULL | NULL | NULL | XXX |
| Q12 | A | NULL | NULL | NULL | NULL | NULL | XXX |

| | QID (30) | SAS (32) | QIZID (34) | QIZAS (36) | PROC (38) | PAR (40) | CHLD (42) | MD (44) |
|---|---|---|---|---|---|---|---|---|
| 28(1) | Q1 | NA | Z1 | A | NULL | NULL | NULL | XXX |
| 28(2) | Q2 | NA | Z1 | A | NULL | NULL | NULL | XXX |
| 28(3) | Q3 | NA | Z1 | A | NULL | NULL | NULL | XXX |
| 28(4) | Q4 | NA | Z1 | A | NULL | NULL | NULL | XXX |
| 28(5) | Q5 | NA | Z1 | A | NULL | NULL | NULL | XXX |
| 28(6) | Q6 | NA | Z1 | A | NULL | NULL | NULL | XXX |
| 28(7) | Q7 | NA | NULL | NULL | NULL | NULL | NULL | XXX |
| 28(8) | Q8 | NA | NULL | NULL | NULL | NULL | NULL | XXX |
| 28(9) | Q9 | NA | Z1 | NA | PF | NULL | NULL | XXX |
| 28(10) | Q10 | NA | Z1 | NA | PF | NULL | NULL | XXX |
| 28(11) | Q11 | A | NULL | NULL | NULL | NULL | NULL | XXX |
| 28(12) | Q12 | A | NULL | NULL | NULL | NULL | NULL | XXX |

| | QID | SAS | QIZID | QIZAS | PROC | PAR | CHLD | MD |
|---|---|---|---|---|---|---|---|---|
| 28(1) | Q1 | NA | Z1 | A | NULL | NULL | NULL | XXX |
| 28(2) | Q2 | NA | Z1 | A | NULL | NULL | NULL | XXX |
| 28(3) | Q3 | NA | Z1 | A | NULL | NULL | NULL | XXX |
| 28(4) | Q4 | NA | Z1 | A | NULL | NULL | NULL | XXX |
| 28(5) | Q5 | NA | Z1 | A | NULL | NULL | NULL | XXX |
| 28(6) | Q6 | NA | Z1 | A | NULL | NULL | NULL | XXX |
| 28(7) | Q7 | NA | Z1 | NA | PF | NULL | NULL | XXX |
| 28(8) | Q8 | NA | Z1 | NA | PF | NULL | NULL | XXX |
| 28(9) | Q9 | A | NULL | NULL | NULL | NULL | NULL | XXX |
| 28(10) | Q10 | A | NULL | NULL | NULL | NULL | NULL | XXX |
| 28(11) | Q11 | NA | Z2 | A | NULL | NULL | NULL | XXX |
| 28(12) | Q12 | NA | Z2 | A | NULL | NULL | NULL | XXX |

| | QID | SAS | QIZID | QIZAS | PROC | PAR | CHLD | MD |
|---|---|---|---|---|---|---|---|---|
| 28(1) | Q1 | NA | Z1 | A | NULL | NULL | NULL | XXX |
| 28(2) | Q2 | NA | Z1 | A | NULL | NULL | NULL | XXX |
| 28(3) | Q3 | NA | Z1 | A | NULL | NULL | NULL | XXX |
| 28(4) | Q4 | NA | Z1 | A | NULL | NULL | NULL | XXX |
| 28(5) | Q5 | NA | Z1 | A | NULL | NULL | NULL | XXX |
| 28(6) | Q6 | NA | Z1 | A | NULL | NULL | NULL | XXX |
| 28(7) | Q7 | NA | Z2 | A | NULL | NULL | NULL | XXX |
| 28(8) | Q8 | NA | Z2 | A | NULL | NULL | NULL | XXX |
| 28(9) | Q9 | NA | Z1 | NA | PF | NULL | NULL | XXX |
| 28(10) | Q10 | NA | Z1 | NA | PF | NULL | NULL | XXX |
| 28(11) | Q11 | A | NULL | NULL | NULL | NULL | NULL | XXX |
| 28(12) | Q12 | A | NULL | NULL | NULL | NULL | NULL | XXX |

MIGRATING EXECUTING QUANTUM PROCESSES INTO QUANTUM ISOLATION ZONES (QIZs)

BACKGROUND

Quantum computing involves the use of quantum bits, referred to herein as "qubits," which have characteristics that differ from those of classical (i.e., non-quantum) bits used in classical computing. Qubits may be employed by quantum processes that are executed by quantum computing devices to provide desired functionality. As quantum computing continues to increase in popularity and become more commonplace, functionality for programmatically coordinate access to qubits will be desirable.

SUMMARY

The examples disclosed herein migrate executing quantum processes into quantum isolation zones (QIZs) in quantum computing devices. In one example, a quantum computing device, upon determining to migrate a currently executing quantum process into a QIZ, transfers qubits of the quantum process into the QIZ and associates the quantum process with the QIZ for continued execution.

In another example, a method for migrating executing quantum processes into QIZs is disclosed. The method comprises determining, by a quantum computing device, to migrate a quantum process currently executing using a first one or more qubits on the quantum computing device into a first QIZ, wherein the first QIZ limits qubit visibility of any quantum process associated with the first QIZ to a plurality of qubits associated with the first QIZ. The method further comprises, responsive to determining to migrate the quantum process, transferring the first one or more qubits to the first QIZ. The method also comprises associating the quantum process with the first QIZ. The method additionally comprises continuing execution of the quantum process within the first QIZ.

In another example, a quantum computing device for migrating executing quantum processes into QIZs is disclosed. The quantum computing device comprises a system memory, and a processor device communicatively coupled to the system memory. The processor device is to determine to migrate a quantum process currently executing using a first one or more qubits on the quantum computing device into a first QIZ, wherein the first QIZ limits qubit visibility of any quantum process associated with the first QIZ to a plurality of qubits associated with the first QIZ. The processor device is further to, responsive to determining to migrate the quantum process, transfer the first one or more qubits to the first QIZ. The processor device is also to associate the quantum process with the first QIZ. The processor device is additionally to continue execution of the quantum process within the first QIZ.

In another example, a non-transitory computer-readable medium for migrating executing quantum processes into QIZs is disclosed. The non-transitory computer-readable medium stores thereon computer-executable instructions that, when executed, cause one or more processor devices to determine to migrate a quantum process currently executing using a first one or more qubits on a quantum computing device into a first QIZ, wherein the first QIZ limits qubit visibility of any quantum process associated with the first QIZ to a plurality of qubits associated with the first QIZ. The computer-executable instructions further cause the one or more processor devices to, responsive to determining to migrate the quantum process, transfer the first one or more qubits to the first QIZ. The computer-executable instructions also cause the one or more processor devices to associate the quantum process with the first QIZ. The computer-executable instructions additionally cause the one or more processor devices to continue execution of the quantum process within the first QIZ.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
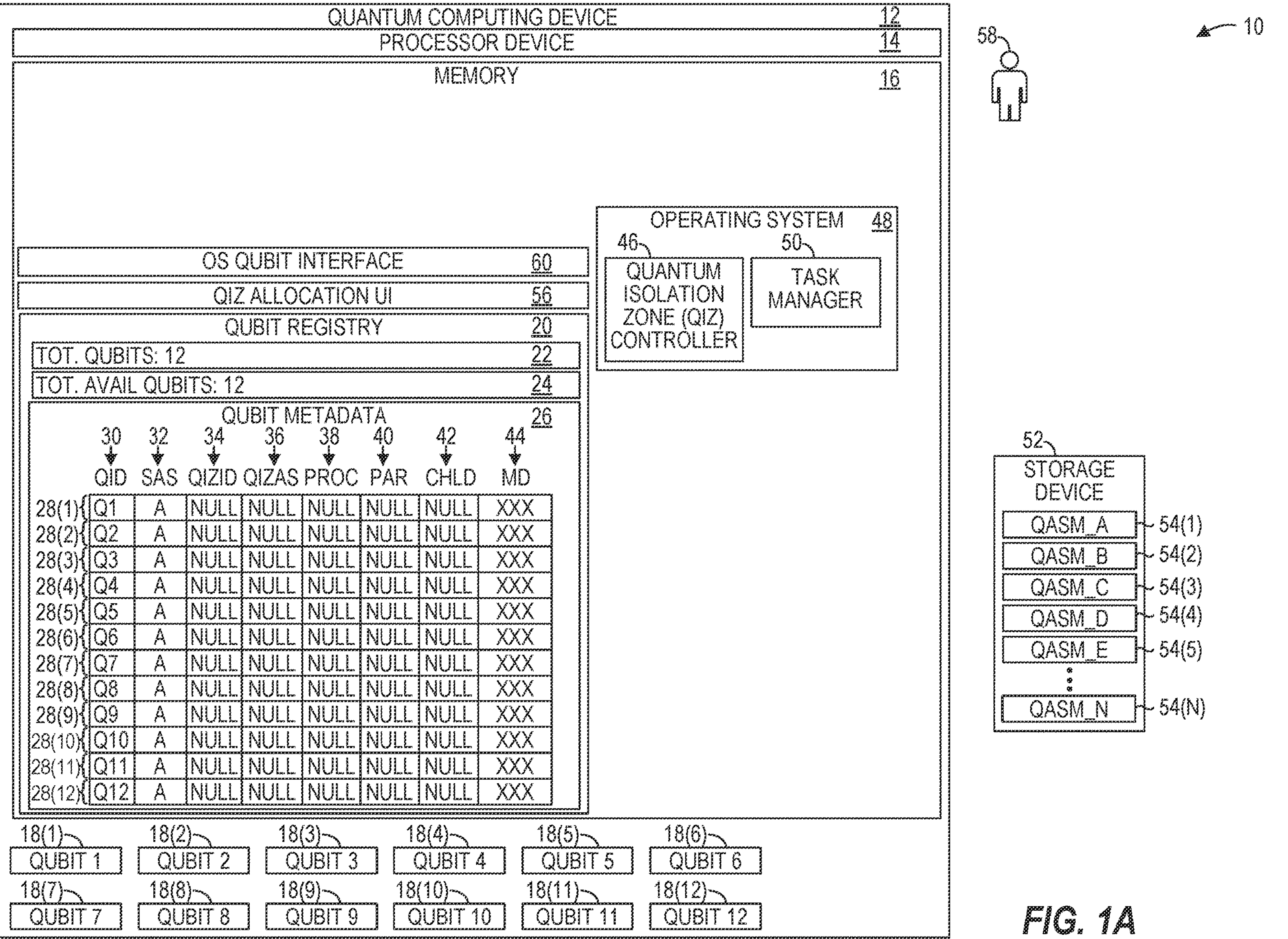
FIGS. 1A-1F are block diagrams of an environment, at successive points in time, in which quantum isolation zones (QIZs) can be implemented according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources, but as the technology evolves, quantum computing systems are implementing larger and larger numbers of qubits. As quantum computing continues to increase in popularity and become more commonplace, it is increasingly important for the operating system to control access to qubits, for example, to ensure that one quantum process does not inadvertently access a qubit utilized by another quantum process, to ensure that qubits containing private information can only be accessed by quantum processes that should have access to such private information, and to generally isolate one quantum process from another quantum process.

The examples disclosed herein implement quantum isolation zones (QIZs) to ensure a that quantum process can only access qubits allocated to the QIZ in which the quantum process executes, and that the quantum process has no visibility to or ability to access qubits external to the QIZ in which the quantum process executes (e.g., qubits that are allocated to other QIZs or that are otherwise implemented on the quantum computing system). The examples disclosed herein also implement quantum process relationship graphs that facilitate visibility of qubits by a plurality of quantum processes that execute within a QIZ and that have relationships with one another. A first quantum process executing in a QIZ that is not related to a second quantum process executing in the same QIZ has no visibility to the qubits allocated to the second quantum process. Thus, the examples facilitate isolation even within the same QIZ while enabling qubit sharing within the same QIZ among related quantum processes.

Additional examples disclosed herein provide migration of executing quantum processes into QIZs. In one example, a migration service executing on a quantum computing device determines to migrate a quantum process currently executing using a first one or more qubits on the quantum computing device into a first QIZ, wherein the first QIZ limits qubit visibility of any quantum process associated with the first QIZ to a plurality of qubits associated with the first QIZ. In some examples, the determination may be made based on an attribute of the quantum process (e.g., a response time of the quantum process, an execution time of the quantum process, a noise tolerance of the quantum process, or a contention tolerance of the quantum process) exceeding a migration threshold. In response to determining to migrate the quantum process, the migration service transfers the first one or more qubits to the first QIZ. As used herein, to "transfer" the first one or more qubits may refer to associating the first one or more qubits themselves with the first QIZ, or may refer to copying data values of the first one or more qubits into a corresponding one or more qubits associated with the first QIZ. The migration service also associates the quantum process with the first QIZ (e.g., by associating the quantum process with the first QIZ if the quantum process is not already associated with a QIZ, or by changing the QIZ with which the quantum process is associated to the first QIZ). The quantum computing device then continues execution of the quantum process within the first QIZ.

FIGS. 1A-1F are block diagrams of an environment, at successive points in time, in which QIZs can be practiced, according to one example. As seen in FIG. 1A, an environment 10 includes a quantum computing device 12 that operates in a quantum environment, but is capable of operating using classical computing principles or quantum computing principles. When using quantum computing principles, the quantum computing device 12 performs computations that utilize quantum-mechanical phenomena, such as superposition and entanglement. The quantum computing device 12 may operate under certain environmental conditions, such as at or near zero degrees (0°) Kelvin. When using classical computing principles, the quantum computing device 12 utilizes binary digits that have a value of either one (1) or zero (0).

The quantum computing device 12 includes a processor device 14 and a memory 16. The quantum computing device 12 in the example of FIG. 1A implements 12 qubits 18(1)-18(12) (generally referred to herein as "qubits 18"). The quantum computing device 12 includes a qubit registry 20 that maintains information about the qubits 18(1)-18(12), including, by way of non-limiting example, a total qubits counter (captioned "TOT.QUBITS" in FIGS. 1A-1F) 22 that identifies the total number of qubits 18 implemented by the quantum computing device 12, as well as a total available qubits counter (captioned "TOT. AVAIL QUBITS" in FIGS. 1A-1F) 24 that maintains count of the total number of qubits 18 that are currently available for allocation.

The qubit registry 20 also maintains qubit metadata 26, which comprises a plurality of metadata records 28(1)-28(12) (generally referred to herein as "metadata records 28"), each of which maintains information about a corresponding qubit 18(1)-18(12). Each metadata record 28 includes a qubit identifier (QID) 30 that contains an identifier of the qubit 18(1)-18(12) to which the respective metadata record 28 corresponds; a system availability status (SAS) 32 that identifies whether the corresponding qubit 18 is available for allocation at the quantum computing system level; a QIZ identifier (QIZID) 34 that identifies the QIZ, if any, to which the corresponding qubit 18 has been allocated; and a QIZ availability status (QIZAS) 36 that identifies whether the corresponding qubit 18, if allocated to a QIZ, is available in the QIZ or has been allocated to a quantum process executing in the QIZ.

Each metadata record 28 also includes a process identifier (captioned "PROC" in FIGS. 1A-1F) 38 of the quantum process, if any, to which the corresponding qubit 18 has been allocated; a parent identifier (captioned "PAR" in FIGS. 1A-1F) 40 that identifies a parent quantum process, if any, of the quantum process to which the corresponding qubit 18 has been assigned; and a child identifier (captioned "CHLD" in FIGS. 1A-1F) 42 that identifies a child quantum process, if any, of the quantum process to which the corresponding qubit 18 has been assigned. Each metadata record 28 may further include additional metadata (captioned "MD" in FIGS. 1A-1F) 44 that are not relevant to the examples disclosed herein, such as metadata indicating a real-time state of the corresponding qubit 18, metadata indicating whether the qubit 18 is in a state of entanglement or superposition, or the like. While solely for purposes of illustration the quantum computing device 12 is described as having 12 qubits 18, it is to be understood that the quantum computing device 12 may provide more or fewer qubits 18 in some examples.

At a point in time illustrated in FIG. 1A, the qubits 18 are unallocated, and thus the system availability status 32 for each metadata record 28 has a value of "A" to indicate that the corresponding qubit 18 is available. The values of the other fields in the metadata records 28 have a value of "NULL," which may comprise any value that indicates that the corresponding field is empty.

The quantum computing device 12 includes a QIZ controller 46 that, as described in greater detail below, operates to establish QIZs that each allow quantum processes to execute and access qubits 18 allocated to that QIZ, but restrict or deny access to any of the qubits 18 that are allocated to other QIZs. The QIZ controller 46 may be an operating system component (e.g., a kernel module or the like) of an operating system 48. As such, the QIZ controller 46 may run at a ring 0 level of the processor device 14 and thus execute in a kernel mode and a kernel space rather than as a user process in a user space. The quantum computing device 12 also includes a task manager 50 that is configured to initiate a quantum process from a process definition file, such as a quantum assembly language (QASM) file, or the like. In this example, a storage device 52 contains a plurality of QASM files 54(1)-54(N), each of which includes quantum programming instructions that, when executed, implement a desired functionality.

The quantum computing device 12 may further include a QIZ allocation user interface (UI) 56 that allows an operator 58 to interact with the QIZ controller 46 to establish a QIZ. The quantum computing device 12 may also include an operating system (OS) qubit interface 60 that is invoked when a quantum process attempts to read, write, or otherwise query a qubit 18. In some examples, the OS qubit interface 60 may, in turn, communicate with the QIZ controller 46, while some examples may provide that the QIZ controller 46 is integrated with the OS qubit interface 60.

It is assumed in the example of FIGS. 1A-1F that that the QIZ controller 46 receives a request from a requestor to allocate a first group of qubits 18 from available qubits 18 to establish a first QIZ that limits visibility of any quantum process associated with the first QIZ to only the qubits 18 in the first group of qubits 18. The request may identify the number of qubits 18 and, if applicable, other criteria, such as a particular type or other desired characteristic of the qubits 18.

In one example, the requestor may be the QIZ allocation UI 56 which makes the request in response to input from the operator 58. In another example, the request may be a programmatic request from a process executing on the quantum computing device 12 or elsewhere. The request may come directly to the QIZ controller 46, or indirectly via the OS qubit interface 60. In this example, the request indicates that six (6) qubits 18 are to be allocated to the QIZ. The QIZ controller 46 accesses the qubit metadata 26 and identifies six (6) qubits 18 that have a system availability status 32 that indicates the qubits 18 are available. In the example of FIG. 1A, the QIZ controller 46 determines that the qubits 18(1)-18(6) are available based on the system availability status 32 of the metadata records 28(1)-28(6).

Figure 1B:
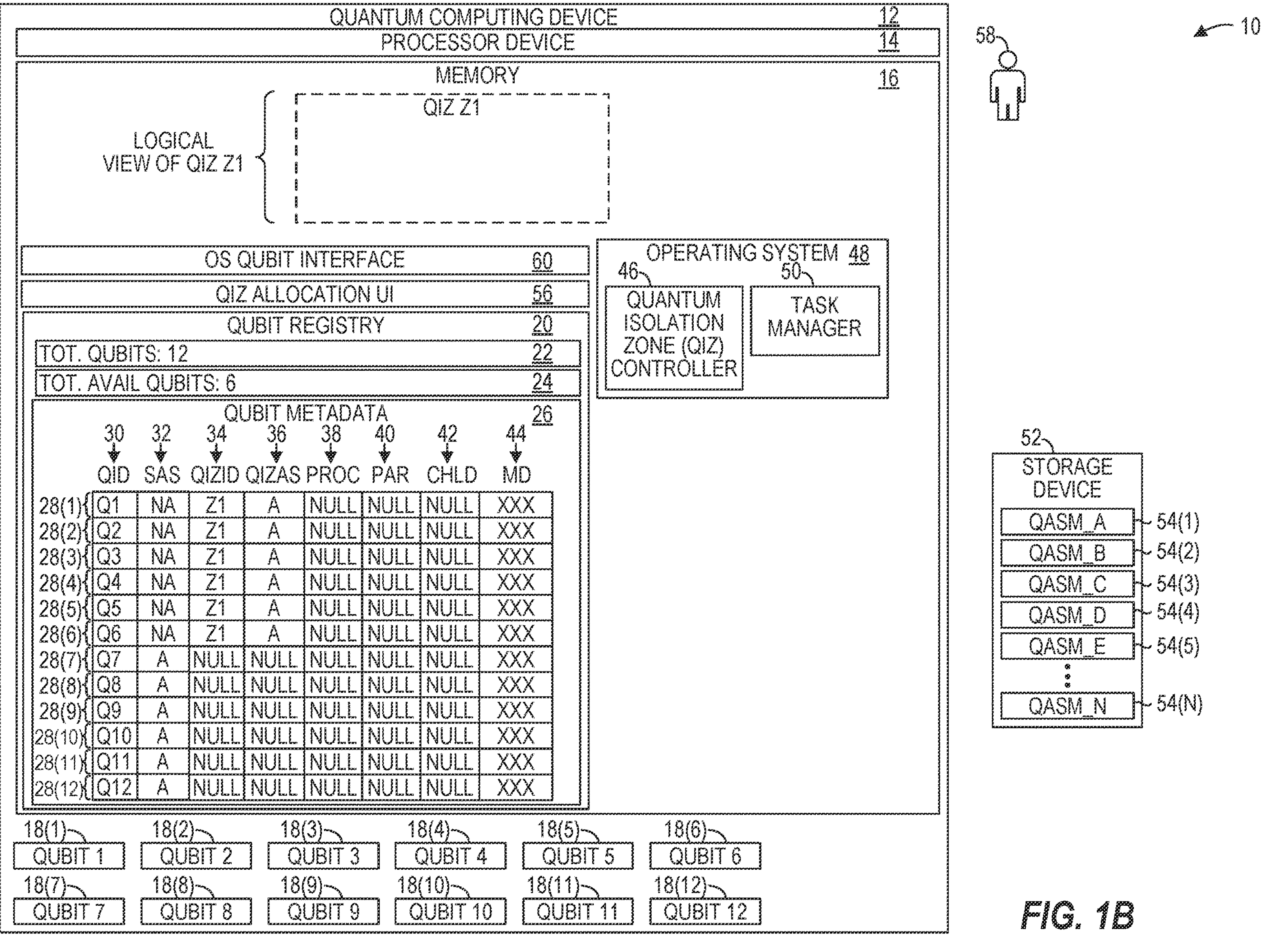

Referring now to FIG. 1B, the QIZ controller 46 modifies the system availability status 32 of the metadata records 28(1)-28(6) with a value of "NA" (i.e., not available) to indicate that the qubits 18(1)-18(6) are no longer available for allocation. The QIZ controller 46 next obtains a unique QIZ identifier (in this example, "Z1"), and modifies the QIZID 34 to indicate that the qubits 18(1)-18(6) have been allocated to the QIZ Z1. Some examples may provide that the QIZ controller 46 generates the unique QIZID, or is provided the unique QIZID by the requestor or via some other mechanism. The QIZ controller 46 then modifies the QIZ availability status 36 to indicate that the qubits 18(1)-18(6) are available for allocation within the QIZ Z1. The QIZ controller 46 modifies the total available qubits counter 24 to indicate that six (6) qubits (i.e., the qubits 18(7)-18(12)) are now available for allocation to a QIZ.

To better facilitate an understanding of the isolation and relationship aspects of QIZs implemented by the examples herein, a logical view of QIZ Z1 is illustrated in dashed lines in FIGS. 1B-1F. However, it is to be understood that the QIZ Z1 illustrated in FIGS. 1B-1F in dashed outline is a logical depiction provided only for ease of understanding, and that the functionality of the QIZ Z1 is implemented via the QIZ controller 46, the qubit metadata 26, and other components as described herein.

For the sake of illustration, it is assumed in FIG. 1B that the task manager 50 receives a request to initiate a quantum process based on the QASM file 54(1) into the QIZ Z1. The request may be received according to a schedule, may be received programmatically, or may be initiated via input from the operator 58. The task manager 50 may access the QASM file 54(1) and parse the QASM file 54(1) to determine that, during execution, a quantum process initiated from the QASM file 54(1) will utilize two (2) of the qubits 18. In other examples, the number of qubits 18 to be allocated to the quantum process may be contained in the request to initiate the quantum process. The task manager 50 sends a request to the QIZ controller 46 for an allocation of two (2) of the qubits 18 from the QIZ Z1. The QIZ controller 46 receives the request to allocate two (2) of the qubits 18 in the QIZ Z1 to a quantum process that is, or will be, associated with the QIZ Z1. Based on the metadata records 28, the QIZ controller 46 determines that the qubits 18(1) and 18(2) are available for allocation within the QIZ Z1.

Figure 1C:
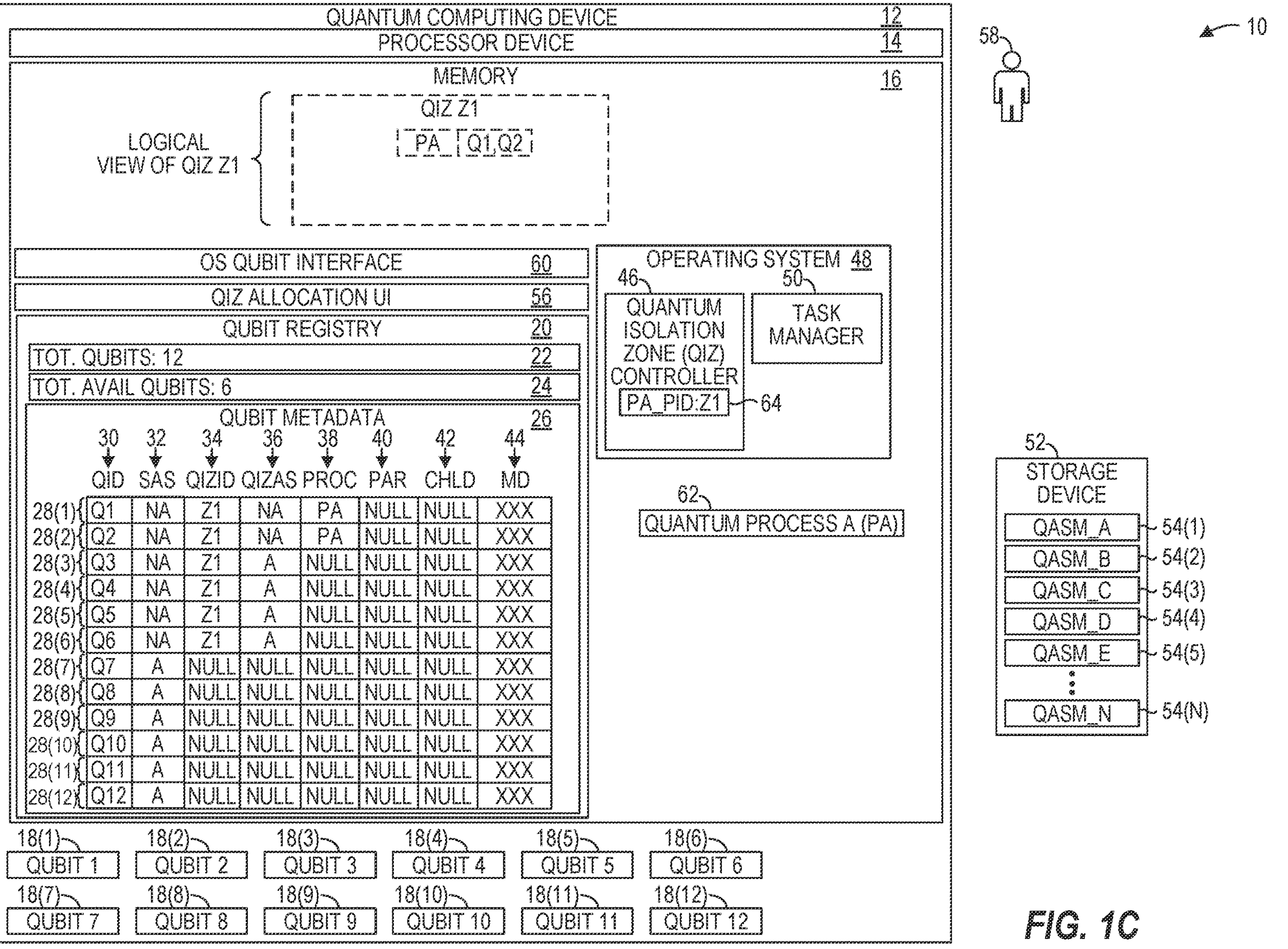

Referring now to FIG. 1C, the QIZ controller 46 modifies the QIZ availability status 36 of the metadata records 28(1) and 28(2) (e.g., by setting the value to "NA") to indicate that the corresponding qubits 18(1) and 18(2) have been allocated, and thus are no longer available for allocation. The QIZ controller 46 provides the qubit IDs of the qubits 18(1) and 18(2) to the task manager 50, which then initiates a quantum process (captioned as "PA" in FIGS. 1C-1F) 62 into the QIZ Z1 with location and/or address information of the qubits 18(1) and 18(2). The task manager 50 provides a unique program ID (PID) of the quantum process 62 (captioned as "PA_PID" in FIGS. 1C-1F) to the QIZ controller 46. The QIZ controller 46 maintains a mapping record 64 that maps the PID to the QIZ Z1. The quantum process 62 is now said to "execute in" or be "associated with" the QIZ Z1, because the visibility of and access to the qubits 18(1)-18(12) by the quantum process 62 is now constrained by the QIZ Z1.

As an example, assume that, at the point in time illustrated in FIG. 1C, the quantum process 62 issues a request to the OS qubit interface 60 to obtain a list of qubit IDs of all qubits 18 to which the quantum process 62 has access (i.e., read access and/or write access) or which are available for allocation. The OS qubit interface 60 communicates with the QIZ controller 46. The QIZ controller 46 determines the PID of the requestor, which in this case is the PID PA_PID, the PID of the quantum process 62. The QIZ controller 46 accesses the mapping record 64 and determines that the quantum process 62 is associated with the QIZ Z1. The QIZ controller 46 accesses the metadata records 28, and determines that the qubits 18(1)-18(6) have been allocated to the QIZ Z1, and that the four (4) qubits 18(3)-18(6) are available. Because the qubits 18(1) and 18(2) have already been allocated to the quantum process 62, and the four qubits 18(3)-18(6) are available, the QIZ controller 46 returns the qubit IDs of the qubits 18(1)-18(6) to the quantum process 62 via the OS qubit interface 60, indicating that the quantum process 62 has access to the qubits 18(1) and 18(2) and that the qubits 18(3)-18(6) are available for allocation. Thus, from the perspective of the quantum process 62, the quantum computing device 12 contains four (4) available qubits 18, and the quantum process 62 is unaware of and unable to access (e.g., is isolated from) the actual additional available qubits 18(7)-18(12).

Assume further that, in response to the information that the qubits 18(3)-18(6) are available, the quantum process 62 issues a request to the OS qubit interface 60 to have an additional qubit 18 allocated to the quantum process 62. The OS qubit interface 60 provides the request to the QIZ controller 46. The QIZ controller 46 then selects one (1) of the qubits 18(3)-18(6), modifies the appropriate metadata record 28 to indicate the qubit 18 is now allocated to the quantum process 62, and returns information to the quantum process 62 identifying the allocated qubit 18. Note that this is merely an example of a potential action that the quantum process 62 may take, and is thus not reflected in the metadata records 28 illustrated in FIG. 1C.

Figure 1D:
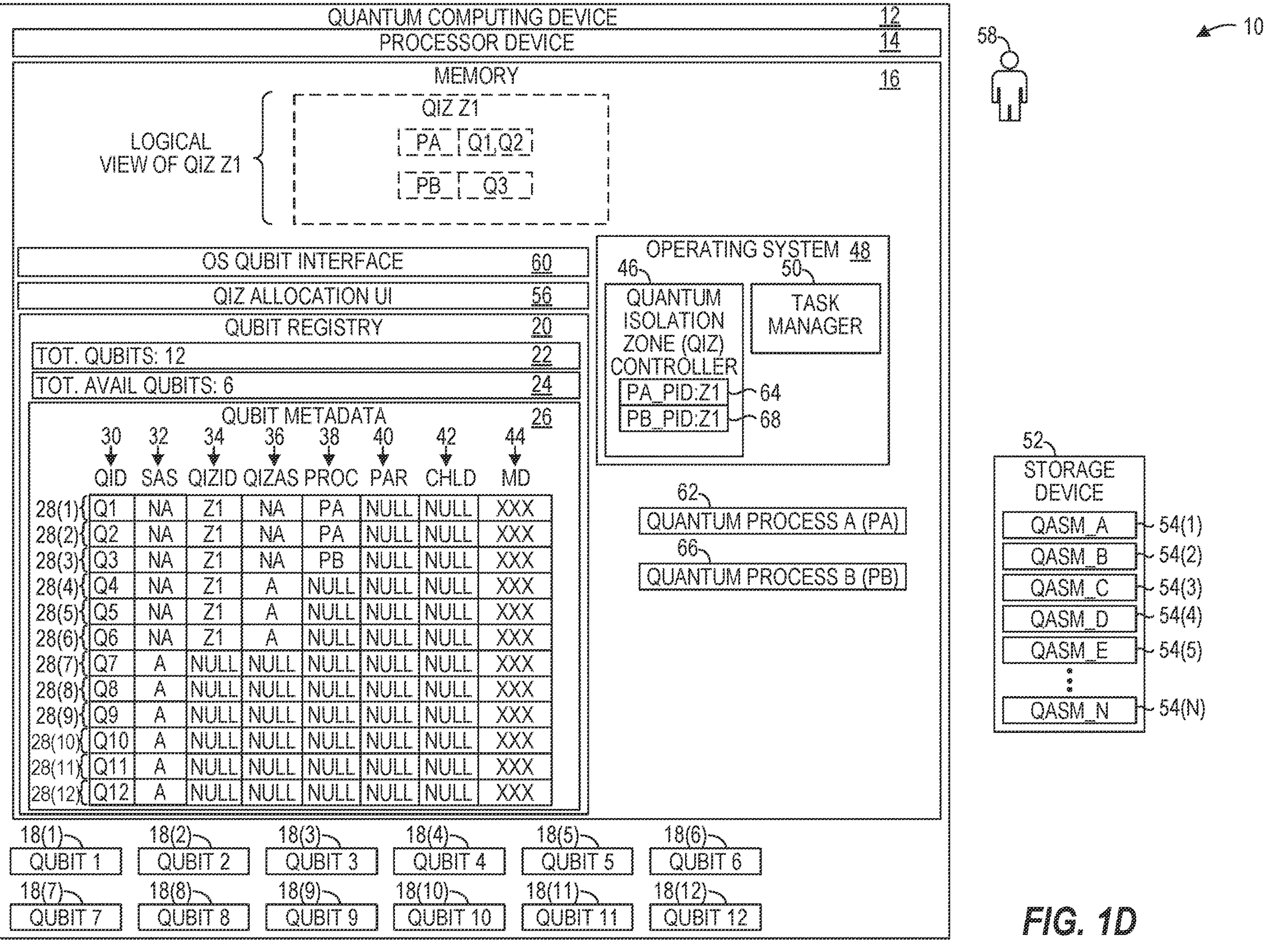

Assume also that the task manager 50 receives a request to initiate a quantum process based on the QASM file 54(2) into the QIZ Z1. The task manager 50 may access the QASM file 54(2) and parse the QASM file 54(2) to determine that, during execution, the quantum process will utilize one (1) qubit 18. The task manager 50 sends a request to the QIZ controller 46 for an allocation of one (1) qubit 18 from the QIZ Z1. The QIZ controller 46 receives the request to allocate one (1) qubit in the QIZ Z1 to a quantum process that is, or will be, associated with the QIZ Z1. Based on the metadata records 28, the QIZ controller 46 determines that the qubit 18(3) is available for allocation within the QIZ Z1. Referring now to FIG. 1D, the QIZ controller 46 modifies the QIZ availability status 36 of the metadata record 28(3) (e.g., by setting the value to "NA") to indicate that the corresponding qubit 18(3) has been allocated and thus is no longer available for allocation.

The QIZ controller 46 provides the qubit ID of the qubit 18(3) to the task manager 50. The task manager 50 initiates a quantum process (captioned as "PB" in FIGS. 1D-1F) 66 into the QIZ Z1 with location information of the qubit 18(3). The task manager 50 provides a unique PID of the quantum process 66 (captioned as "PB_PID" in FIGS. 1D-1F) to the QIZ controller 46. The QIZ controller 46 maintains a mapping record 68 that maps the PID to the QIZ Z1. The quantum process 66 is now said to "execute in" or be "associated with" the QIZ Z1.

Additionally, assume that, at the point in time illustrated in FIG. 1D, subsequent to the allocation of the qubit 18(3) to the quantum process 66, the quantum process 62 issues a request to the OS qubit interface 60 to obtain a list of qubit IDs of all qubits 18 to which the quantum process 62 has access (i.e., read access and/or write access) and which are available for allocation. The OS qubit interface 60 communicates with the QIZ controller 46. The QIZ controller 46 determines the PID of the requestor, which in this case is the PID PA_PID, the PID of the quantum process 62. The QIZ controller 46 accesses the mapping record 64 and determines that the quantum process 62 is associated with the QIZ Z1. The QIZ controller 46 then accesses the metadata records 28 and determines that the qubits 18(1)-18(6) have been allocated to the QIZ Z1, the qubit 18(3) has been allocated to the quantum process 66, and that the three (3) qubits 18(4)-18(6) are available. Based on the metadata record 28(3), the QIZ controller 46 determines that the quantum process 66 is not related to the quantum process 62 because the parent identifier 40 and the child identifier 42 are NULL, indicating that the quantum process 62 has no parent process or child process at this time. Because the quantum process 62 and the quantum process 66 are unrelated, the quantum process 66 has no visibility to or access to qubits 18 allocated to the quantum process 62, and the quantum process 62 has no visibility to or access to qubits 18 allocated to the quantum process 66.

Because the qubit 18(3) has been allocated to the quantum process 66, and the three (3) qubits 18(4)-18(6) are available, the QIZ controller 46 returns the qubit IDs of the qubits 18(1), 18(2), and 18(4)-18(6) to the quantum process 62 via the OS qubit interface 60, indicating that the quantum process 62 has access to the qubits 18(1) and 18(2), and that the qubits 18(4)-18(6) are available for allocation. The quantum process 62 is thus unaware of the qubit 18(3) or the qubits 18(7)-18(12).

Figure 1E:
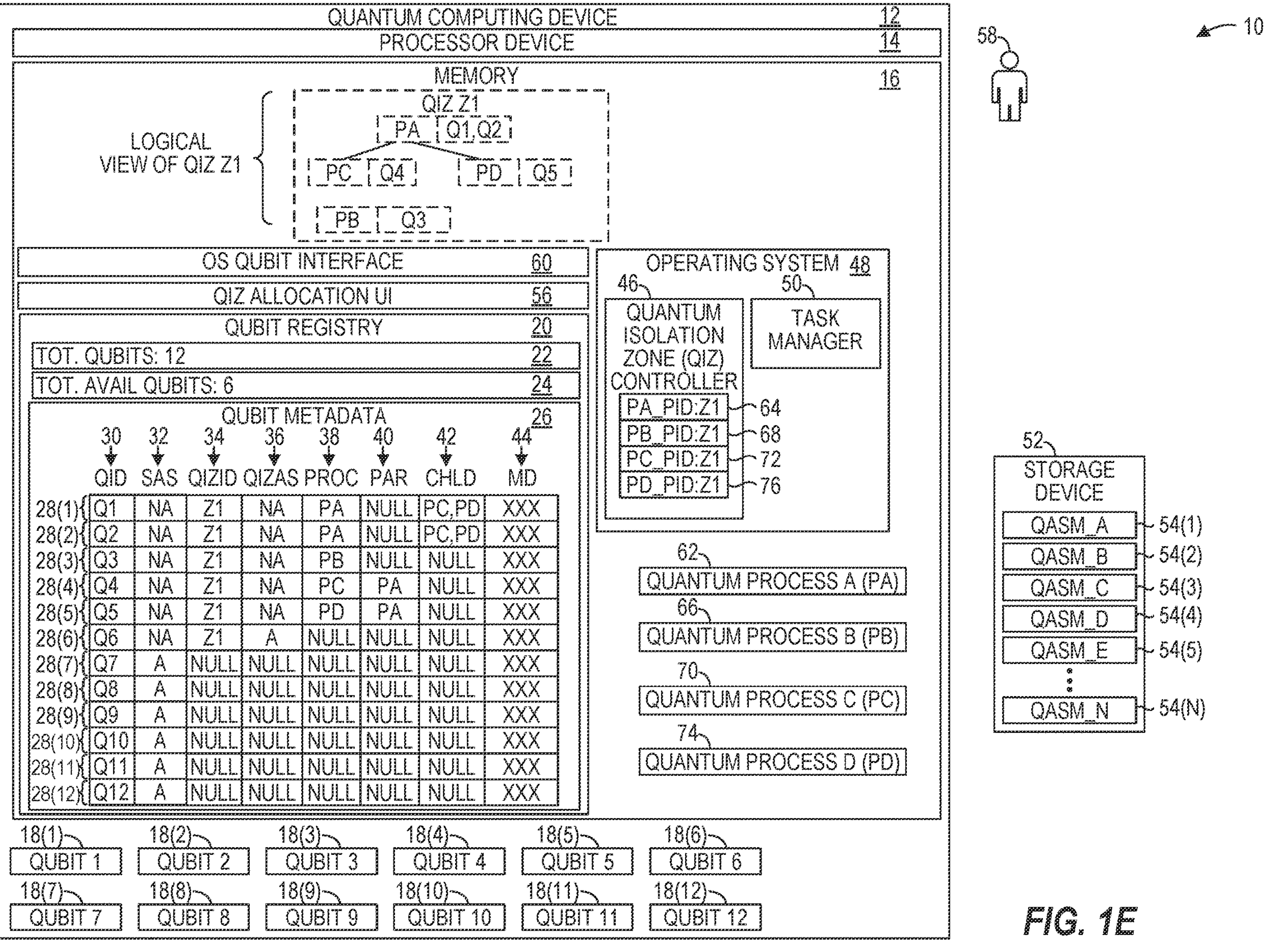

Referring now to FIG. 1E, a QIZ relationship graph that establishes relationships among quantum processes in a QIZ will be discussed. Assume that, in a manner similar to that discussed above with regard to the quantum processes 62 and 66, a quantum process (captioned as "PC" in FIGS. 1E-1F) 70 is initiated from the QASM file 54(3) into the QIZ Z1 and is allocated the qubit 18(4). The QIZ controller 46 generates a mapping record 72 that maps the PID of the quantum process 70 (captioned as "PC_PID" in FIGS. 1E-1F) to the QIZ Z1. However, in this example, the quantum process 70 is identified as a child process of the quantum process 62. The designation may occur in any of several different manners. In one implementation, the task manager 50 may communicate to the QIZ controller 46 that the quantum process 70 is to be designated a child process of the quantum process 62. In another example, the request to initiate the quantum process 70 from the QASM file 54(3), and to allocate a qubit 18 to the quantum process 70, may originate from the quantum process 62. In this example, the act of the quantum process 62 requesting the initiation of the quantum process 70 by itself identifies the parent-child relationship.

The QIZ controller 46 modifies the QIZ availability status 36 of the metadata record 28(4) (e.g., by setting the value to "NA") to indicate that the qubit 18(4) is no longer available for allocation. The QIZ controller 46 also modifies the process identifier 38 of the metadata record 28(4) to indicate that the qubit 18(4) is allocated to the quantum process 70. The QIZ controller 46 additionally modifies the parent identifier 40 of the metadata record 28(4) to indicate that the quantum process 62 is a parent process of the quantum process 70. The QIZ controller 46 also modifies the child identifier 42 of the metadata records 28(1) and 28(2) to indicate that the quantum process 70 is a child process of the quantum process 62.

Assume further that a quantum process (captioned as "PD" in FIGS. 1E-1F) 74 is initiated from the QASM file 54(4) into the QIZ Z1 and allocated the qubit 18(5). The QIZ controller 46 generates a mapping record 76 that maps the PID of the quantum process 74 (captioned as "PD_PID" in FIGS. 1E-1F) to the QIZ Z1. In this example, the quantum process 74 is also identified as a child process of the quantum process 62.

The QIZ controller 46 modifies the QIZ availability status 36 of the metadata record 28(5) (e.g., by setting the value to "NA") to indicate that the qubit 18(5) is no longer available for allocation. The QIZ controller 46 also modifies the process identifier 38 of the metadata record 28(5) to indicate that the qubit 18(5) is allocated to the quantum process 74. The QIZ controller 46 additionally modifies the parent identifier 40 of the metadata record 28(5) to indicate that the quantum process 62 is a parent process of the quantum process 74. The QIZ controller 46 modifies the child identifier 42 of the metadata records 28(1) and 28(2) to indicate that the quantum process 74 is a child process of the quantum process 62.

The metadata records 28(1), 28(2), 28(4) and 28(5) establish a relationship graph that appears, logically, as that illustrated in the logical view of the QIZ Z1 in FIG. 1E, such that the quantum process 62 is the parent process of the child quantum processes 70 and 74. As will be discussed herein, the relationship graph established in the metadata records 28(1), 28(2), 28(4), and 28(5) impacts the visibility of qubits 18 by the quantum processes 62, 66, 70, and 74.

To illustrate the impact of the relationship graph in the QIZ Z1, assume that the quantum process 62 issues a request to the OS qubit interface 60 to obtain a list of qubit IDs of all qubits 18 to which the quantum process 62 has access (i.e., read access and/or write access) or which are available for allocation. The OS qubit interface 60 communicates with the QIZ controller 46. The QIZ controller 46 determines the PID of the requestor, which in this case is the PID PA_PID, the PID of the quantum process 62. The QIZ controller 46 accesses the mapping record 64 and determines that the quantum process 62 is associated with the QIZ Z1. The QIZ controller 46 accesses the metadata records 28 and determines that the qubits 18(1)-18(6) have been allocated to the QIZ Z1, and that the qubit 18(6) is available. The QIZ controller 46 also determines that the qubits 18(1) and 18(2) have been allocated to the quantum process 62. The QIZ controller 46 determines that the quantum process 62 has two (2) child processes executing in the QIZ Z1, the quantum processes 70 and 74. Because the quantum processes 70 and 74 are child processes of the quantum process 62, the quantum process 62 has access to the qubits 18(4) and 18(5) allocated to the quantum processes 70 and 74, respectively. The QIZ controller 46 returns the qubit IDs of the qubits 18(1), 18(2), and 18(4)-18(6), indicating that the quantum process 62 has access to the qubits 18(1), 18(2), 18(4), and 18(5), and that the qubit 18(6) is available for allocation.

Assume next that the quantum process 70 issues a request to the OS qubit interface 60 to obtain a list of qubit IDs of all qubits 18 to which the quantum process 70 has access (i.e., read access and/or write access) or which are available for allocation. The OS qubit interface 60 communicates with the QIZ controller 46. The QIZ controller 46 determines the PID of the requestor, which in this case is the PID PC_PID, the PID of the quantum process 70. The QIZ controller 46 accesses the mapping record 72 and determines that the quantum process 70 is associated with the QIZ Z1. The QIZ controller 46 additionally accesses the metadata records 28 and determines that the qubits 18(1)-18(6) have been allocated to the QIZ Z1, and that the qubit 18(6) is available. The QIZ controller 46 also determines that the qubit 18(4) has been allocated to the quantum process 70. The QIZ controller 46 determines that the quantum process 70 has no child processes executing in the QIZ Z1, and that the quantum process 62 is a parent process of the quantum process 70. Because the quantum process 62 is a parent process of the quantum process 70, the quantum process 70 has access to the qubits 18(1) and 18(2) allocated to the quantum process 62. However, because the quantum process 74 is neither a parent process nor a child process of the quantum process 70, the quantum process 70 has no visibility to the qubit 18(5) allocated to the quantum process 74. The QIZ controller 46 returns the qubit IDs of the qubits 18(1), 18(2), 18(4) and 18(6), indicating that the quantum process 70 has access to the qubits 18(1), 18(2), and 18(4), and that the qubit 18(6) is available for allocation.

Figure 1F:
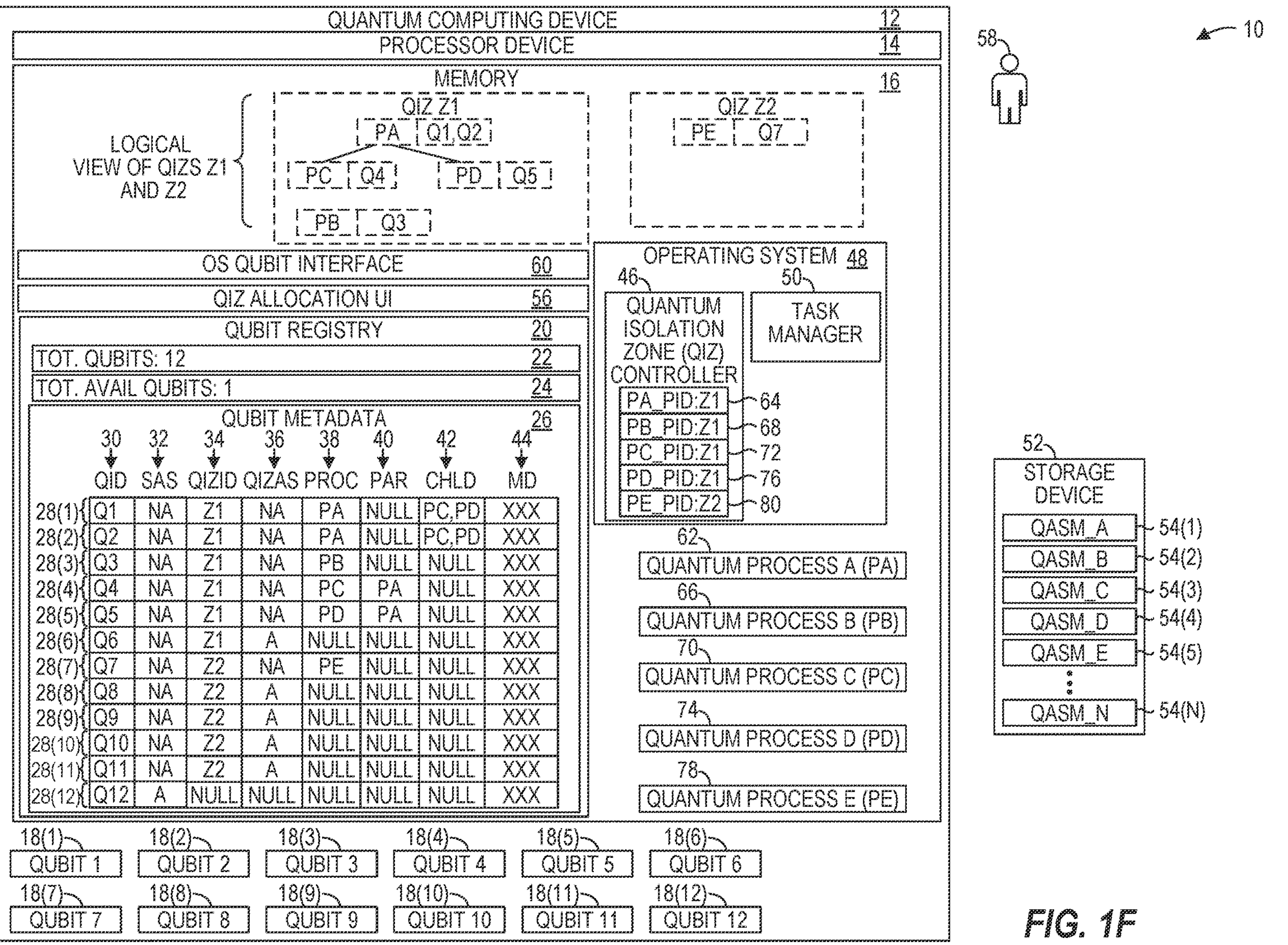

The QIZ controller 46 receives a request, from a requestor, to allocate a second group of qubits 18 from available qubits 18 to establish a second QIZ that limits visibility of any quantum process associated with the second QIZ to only the qubits 18 in the second group of qubits 18. In this example, the request indicates that five (5) qubits 18 are to be allocated to the second QIZ. The QIZ controller 46 accesses the qubit metadata 26 and identifies five (5) qubits 18 that have a system availability status 32 that indicates the qubits 18 are available. In this example, the QIZ controller 46 determines that the five (5) qubits 18(7)-18(11) are available based on the system availability status 32 of the metadata records 28(7)-28(11). Referring now to FIG. 1F, the QIZ controller 46 modifies the system availability status 32 of the metadata records 28(7)-28(11) (e.g., by setting the value to "NA") to indicate that the five (5) qubits 18(7)-18(11) are no longer available for allocation. The QIZ controller 46 obtains a unique QIZ identifier (in this example, "Z2"), and modifies the QIZID 34 of the metadata records 28(7)-28(11) to indicate that the qubits 18(7)-18(11) have been allocated to the QIZ Z2. The QIZ controller 46 modifies the QIZ availability status 36 of the metadata records 28(7)-28(11) (e.g., by setting the value to "A") to indicate that the qubits 18(7)-18(11) are available for allocation within the QIZ Z2. The QIZ controller 46 modifies the total available qubits counter 24 to indicate that one (1) qubit 18 (i.e., qubit 18(12)) is now available for allocation to a QIZ.

Assume further that the task manager 50 receives a request to initiate a quantum process based on the QASM file 54(5) into the QIZ Z2. The task manager 50 may access the QASM file 54(5) and parse the QASM file 54(5) to determine that, during execution, the quantum process initiated from the QASM file 54(5) will utilize one (1) qubit 18. The task manager 50 sends a request to the QIZ controller 46 for an allocation of one (1) qubit 18 from the QIZ Z2. The QIZ controller 46 receives the request to allocate one (1) qubit in the QIZ Z2 to a quantum process that is, or will be, associated with the QIZ Z2. Based on the metadata records 28, the QIZ controller 46 determines that the qubit 18(7) is available for allocation within the QIZ Z2 and modifies the QIZ availability status 36 of the metadata record 28(7) (e.g., by setting the value to "NA") to indicate that the corresponding qubit 18(7) has been allocated and thus is no longer available for allocation.

The QIZ controller 46 provides the qubit ID of the qubit 18(7) to the task manager 50. The task manager 50 initiates a quantum process (captioned as "PE" in FIG. 1F) 78 into the QIZ Z2 with location information of the qubit 18(7). The task manager 50 provides a unique PID of the quantum process 78 (captioned as "PE_PID" in FIG. 1F) to the QIZ controller 46. The QIZ controller 46 generates a mapping record 80 that maps the PID to the QIZ Z2. The quantum process 78 is now said to "execute in" or be "associated with" the QIZ Z2.

Assume that, at the point in time illustrated in FIG. 1F, the quantum process 78 issues a request to the OS qubit interface 60 to obtain a list of qubit IDs of all qubits 18 to which the quantum process 78 has access (i.e., read access and/or write access) or which are available for allocation. The OS qubit interface 60 communicates with the QIZ controller 46. The QIZ controller 46 determines the PID of the requestor, which in this case is the PID PE_PID, the PID of the quantum process 78. The QIZ controller 46 accesses the mapping record 80 and determines that the quantum process 78 is associated with the QIZ Z2. The QIZ controller 46 accesses the metadata records 28 and determines that the qubits 18(7)-18(11) have been allocated to the QIZ Z2, and that the qubits 18(8)-18(11) are available. Because the qubit 18(7) has already been allocated to the quantum process 78 and the four (4) qubits 18(8)-18(11) are available, the QIZ controller 46 returns the qubit IDs of the qubits 18(7)-18(11) to the quantum process 78 via the OS qubit interface 60, indicating that the quantum process 78 has access to the qubit 18(7), and that the qubits 18(8)-18(11) are available for allocation. Thus, from the perspective of the quantum process 78, the quantum computing device 12 contains four (4) available qubits 18, and the quantum process 78 is unaware of and unable to access (e.g., is isolated from) the qubits 18(1)-18(6) and 18(12).

It is noted that because the QIZ controller 46 is a component of the quantum computing device 12, functionality implemented by the QIZ controller 46 may be attributed to the quantum computing device 12 generally. Moreover, in examples where the QIZ controller 46 comprises software instructions that program the processor device 14 to carry out functionality discussed herein, functionality implemented by the QIZ controller 46 may be attributed herein to the processor device 14.

Figure 2:
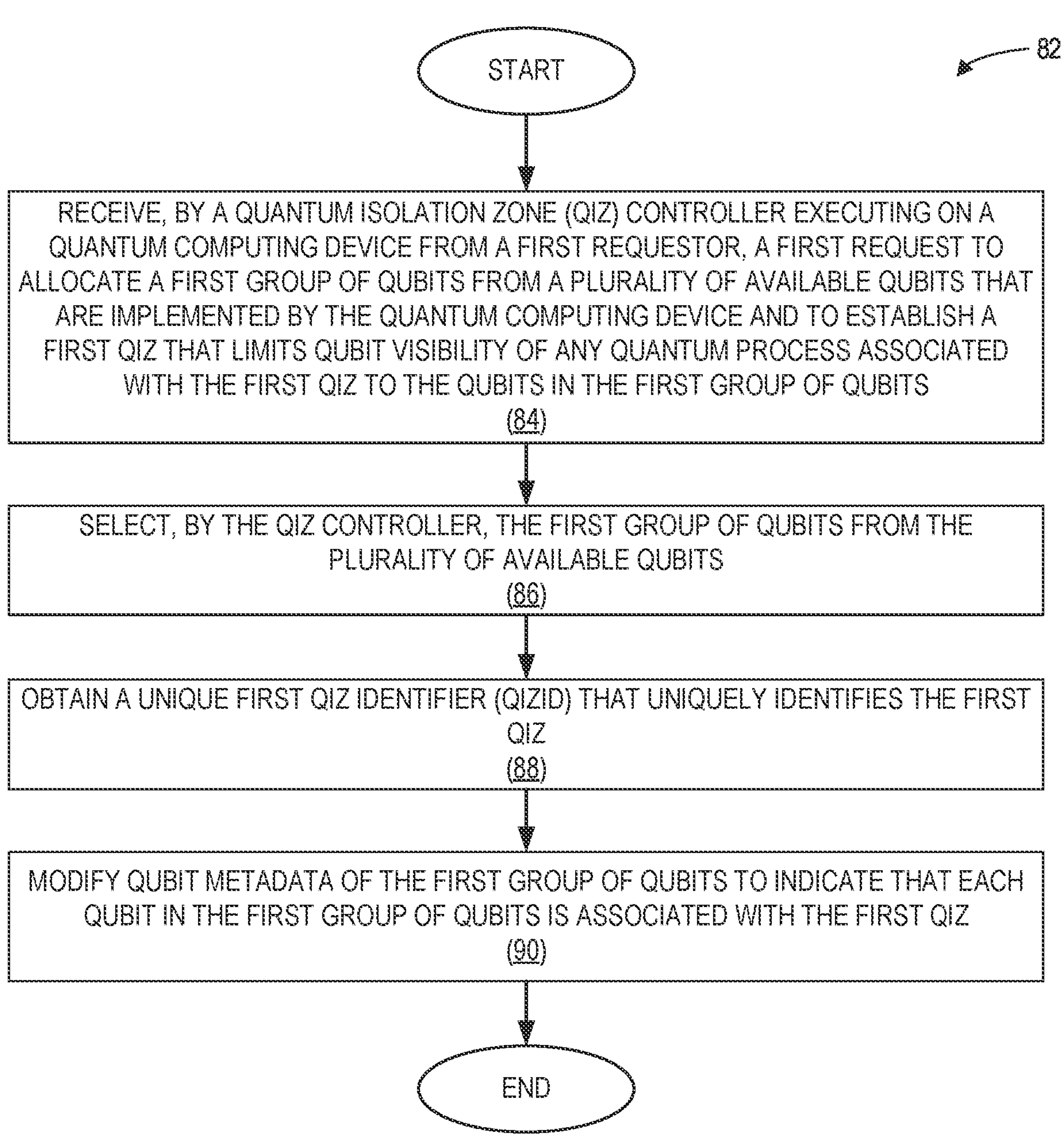
FIG. 2 is a flowchart of a method for implementing QIZs according to one example.

FIG. 2 is a flowchart 82 of a method for implementing QIZs according to one example. FIG. 2 will be discussed in conjunction with FIGS. 1A-1F for the sake of clarity. Operations in FIG. 2 begin with the QIZ controller 46 receiving, from a requestor, a request to allocate a group of the qubits 18 from the plurality of available qubits 18 that are implemented by the quantum computing device 12 and establish the QIZ Z1 that limits qubit visibility of any quantum process associated with the QIZ Z1 to the qubits 18 in the group of qubits 18 (block 84). The QIZ controller 46 selects the first group of qubits 18(1)-18(6) from the plurality of available qubits 18(1)-18(12) (block 86). The QIZ controller 46 obtains the QIZ identifier (QIZID) Z1 that uniquely identifies the QIZ Z1 (block 88). The QIZ controller 46 modifies the qubit metadata (e.g., the metadata records 28(1)-28(6) of FIGS. 1A-1F) of the group of qubits 18(1)-18(6) to indicate that each qubit 18 in the group of qubits 18(1)-18(6) is associated with the QIZ Z1 (block 90).

Additional examples disclosed herein provide that the quantum computing device 12 provides a migration service 92 that is configured to migrate executing quantum processes into QIZs. In this regard, FIGS. 3A-3H provide block diagrams of an environment 10', which is substantially similar to the environment 10 except as otherwise noted herein. FIGS. 3A-3D illustrate changes to the environment 10' by the migration service 92 operating on a quantum process that is currently executing but is not associated with a QIZ, while FIGS. 3E-3H illustrate changes to the environment 10' by the migration service 92 operating on a quantum process that is currently executing and that is associated with a QIZ.

Figure 3A:
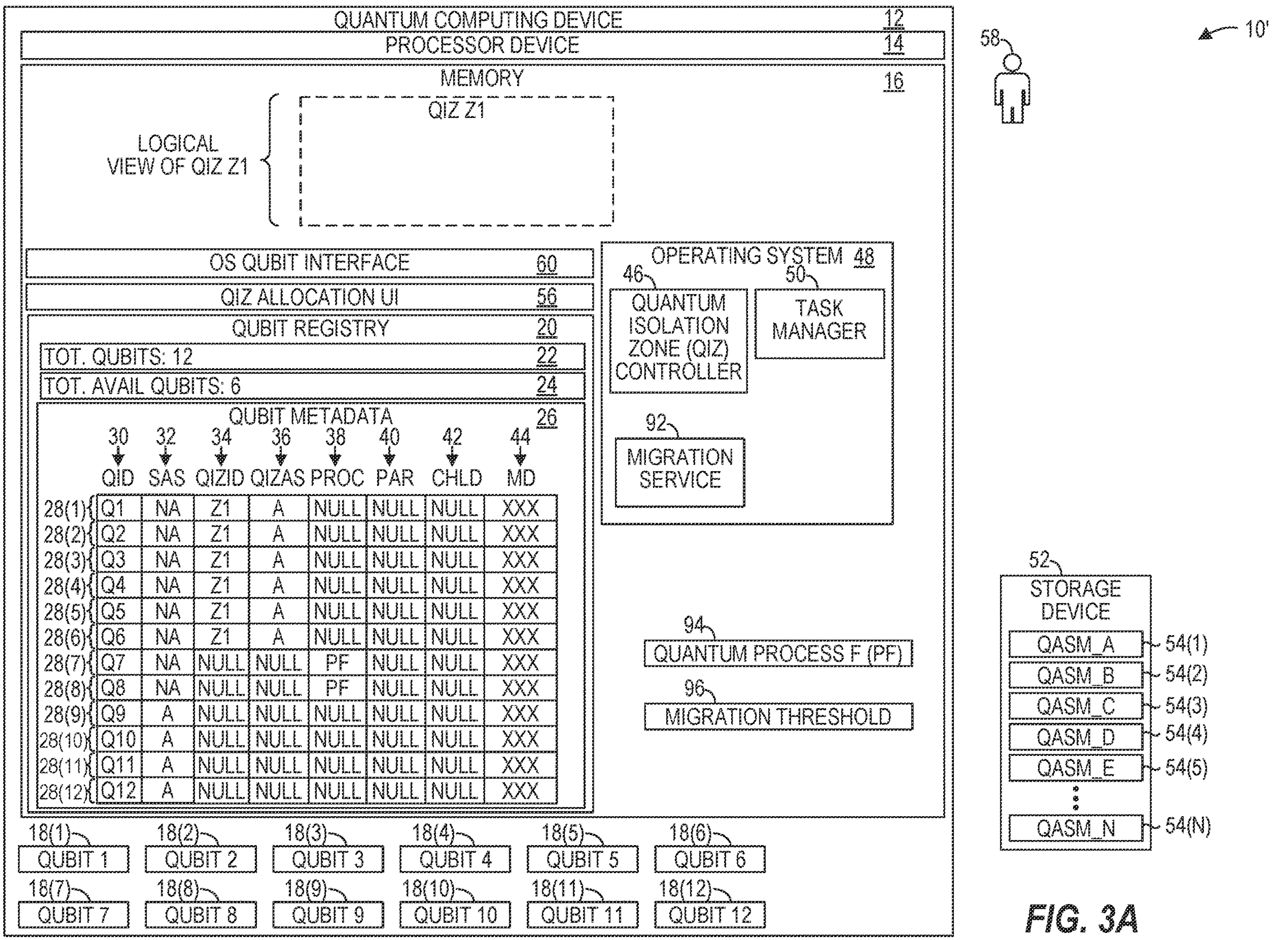
FIGS. 3A-3H are block diagrams of an environment for migrating executing quantum processes into QIZs according to one example.

Referring first to FIG. 3A, the environment 10' is in a state corresponding to that of the environment 10 of FIG. 1B, in that the QIZ Z1 has been established and the qubits 18(1)-18(6) have been allocated to the QIZ Z1. Additionally, the quantum computing device 12 is currently executing a quantum process (captioned as "PF" in FIGS. 3A-3H) 94 using the qubits 18(7) and 18(8), as shown by the process identifier 38 of the metadata records 28(7) and 28(8). Note that the quantum process 94 in FIG. 3A is not associated with a QIZ.

The migration service 92 determines to migrate the quantum process 94 currently executing using the qubits 18(7) and 18(8) into the QIZ Z1. This determination may be based, e.g., on the migration service 92 determining that an attribute of the quantum process 94 has exceeded a migration threshold 96. In some examples, the attribute may comprise a response time of the quantum process 94, an execution time of the quantum process 94, a noise tolerance of the quantum process 94, or a contention tolerance of the quantum process 94, as non-limiting examples. Thus, for instance, the migration threshold 96 may specify a maximum acceptable response time for the quantum process 94, and the migration service 92 may determine to migrate the quantum process 94 into the QIZ Z1 based on a response time of the quantum process 94 exceeded the maximum acceptable response time. Upon determining to migrate the quantum process, the migration service 92 transfers the qubits 18(7) and 18(8) to the QIZ Z1, and associates the quantum process 94 with the QIZ Z1. The quantum computing device 12 then continues execution of the quantum process 94 within the first QIZ.

Figure 3B:
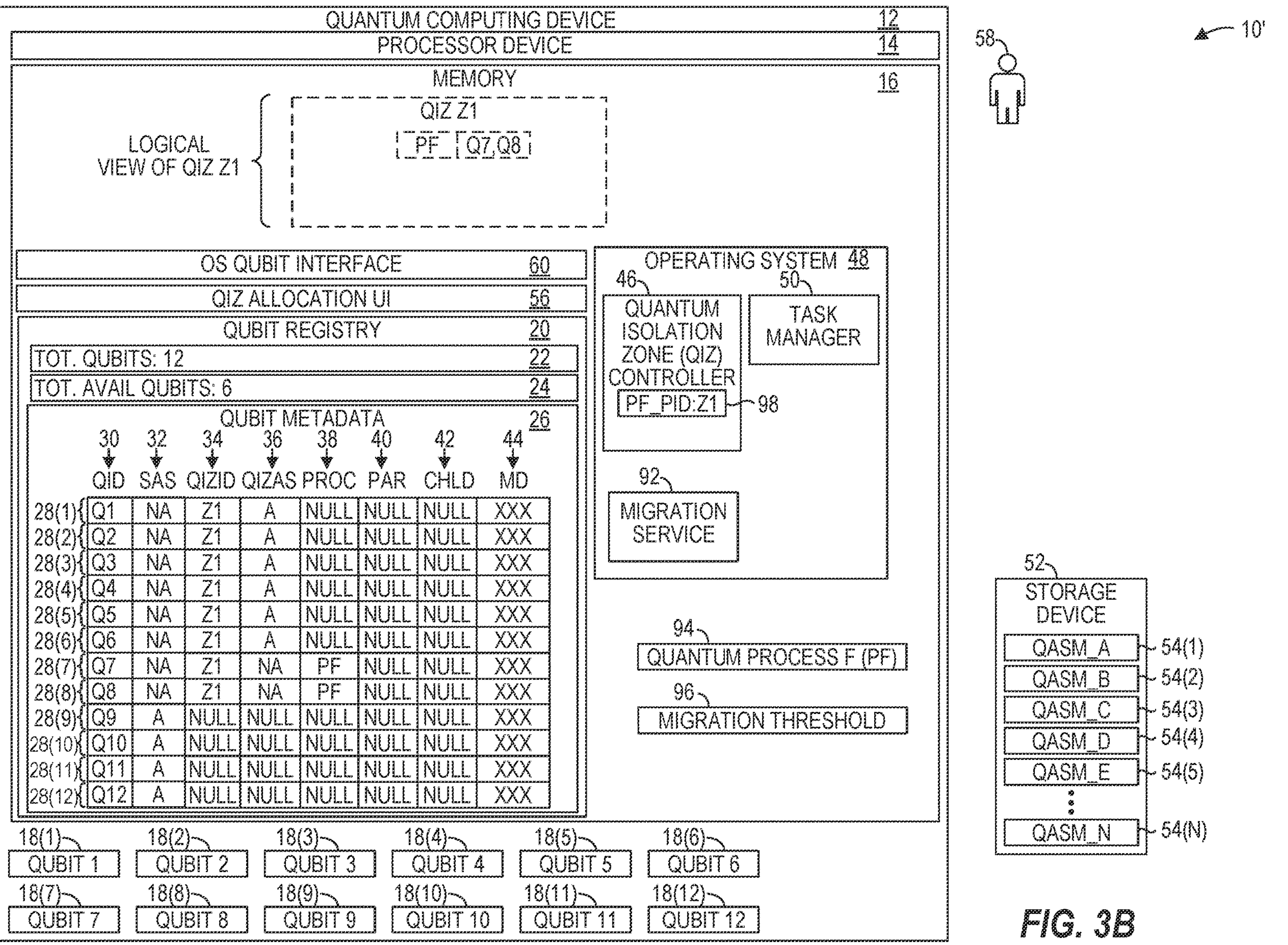

In one example illustrated in FIG. 3B, the migration service 92 transfers the qubits 18(7) and 18(8) to the QIZ Z1 by associating the qubits 18(7) and 18(8) with the QIZ Z1, such that the qubits 18(7) and 18(8) become part of the plurality of qubits to which the control and isolation features provided by the QIZ Z1 apply. This may be accomplished by the migration service 92 sending a request to the QIZ controller 46 to update the metadata records 28(7) and 28(8) corresponding to the qubits 18(7) and 18(8) to modify the QIZID 34 to indicate that the corresponding qubits 18(7) and 18(8) are now associated with the QIZ Z1, and further to modify the QIZ availability status 36 to indicate that the corresponding qubits 18(7) and 18(8) are no longer available for allocation (e.g., "NA"). In addition, the migration service 92 in some examples associates the quantum process 94 with the QIZ Z1 by sending a request to the task manager, which provides a unique PID (captioned as "PF_PID" in FIGS. 3B-3H) of the quantum process 94 to the QIZ controller 46, which maintains a mapping record 98 that maps the PID to the QIZ Z1. The quantum process 94 is now said to "execute in" or be "associated with" the QIZ Z1, because the visibility of and access to the qubits 18(7) and 18(8) is now constrained by the QIZ Z1.

Figure 3C:
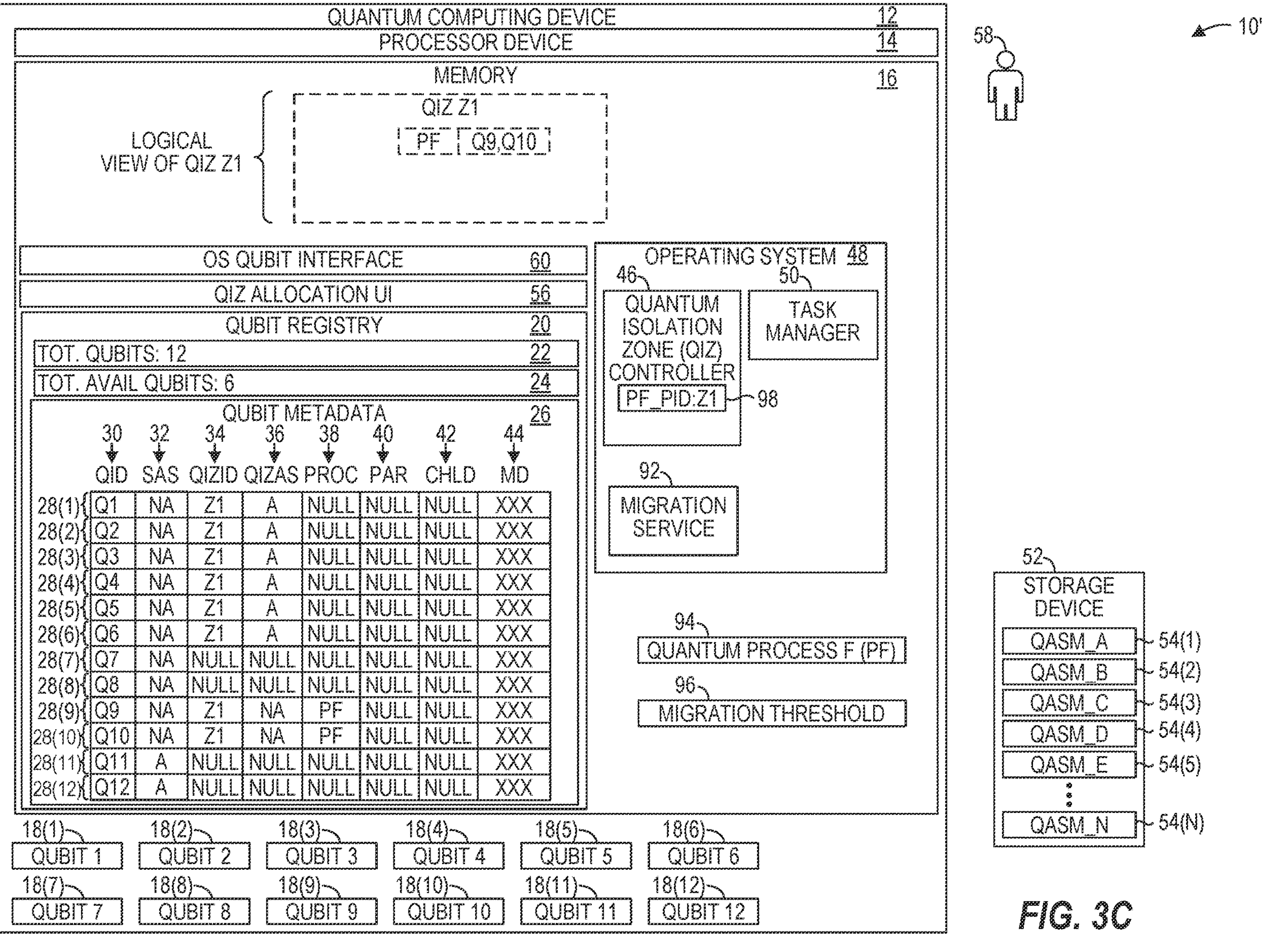

In some examples, such as the example illustrated in FIG. 3C, the migration service 92 transfers the qubits 18(7) and 18(8) to the QIZ Z1 by adding new qubits to the QIZ Z1, and copying data values (not shown) of the qubits 18(7) and 18(8) into the new qubits. Thus, in such examples, the migration service 92 (beginning with the environment 10' as shown in FIG. 3A and transitioning to the state shown in FIG. 3C) selects qubits 18(9) and 18(10) from the plurality of available qubits 18 implemented by the quantum computing device 12, e.g., by sending a request to the QIZ controller 46 to allocate two (2) qubits 18. The QIZ controller 46 accesses the qubit metadata 26 and identifies two (2) qubits 18 that have a system availability status 32 that indicates the qubits 18 are available. The QIZ controller 46 determines that the two (2) qubits 18(9) and 18(10) are available based on the system availability status 32 of the metadata records 28(9)-28(10). The QIZ controller 46 then modifies the QIZID 34 to indicate that the corresponding qubits 18(9) and 18(10) are now associated with the QIZ Z1, and modifies the system availability status 32 of the metadata records 28(9)-28(10) (e.g., by setting the value to "NA") to indicate that the two (2) qubits 18(9)-18(10) are no longer available for allocation.

The migration service 92 next allocates the qubits 18(9) and 18(10) to the quantum process 94 by, e.g., requesting that the QIZ controller 46 modify the QIZID 34 of the metadata records 28(9) and 28(10) to indicate that the corresponding qubits 18(9) and 18(10) are now associated with the QIZ Z1, and modify the QIZ availability status 36 of the metadata records 28(9) and 28(10) to indicate that the corresponding qubits 18(9) and 18(10) have been allocated to the quantum process 94 and thus are no longer available for allocation (e.g., "NA"). The QIZ controller 46 also modifies the process identifier 38 of the metadata records 28(9) and 28(10) to indicate that the qubits 18(9) and 18(10) are allocated to the quantum process 94. The migration service 92 also copies respective data values (not shown) from the qubits 18(7) and 18(8) to the newly allocated qubits 18(9) and 18(10). Finally, the migration service 92 associates the quantum process 94 with the QIZ Z1 as discussed above with respect to FIG. 3B, which results in the quantum process 94 continuing execution using the qubits 18(9) and 18(10).

Figure 3D:
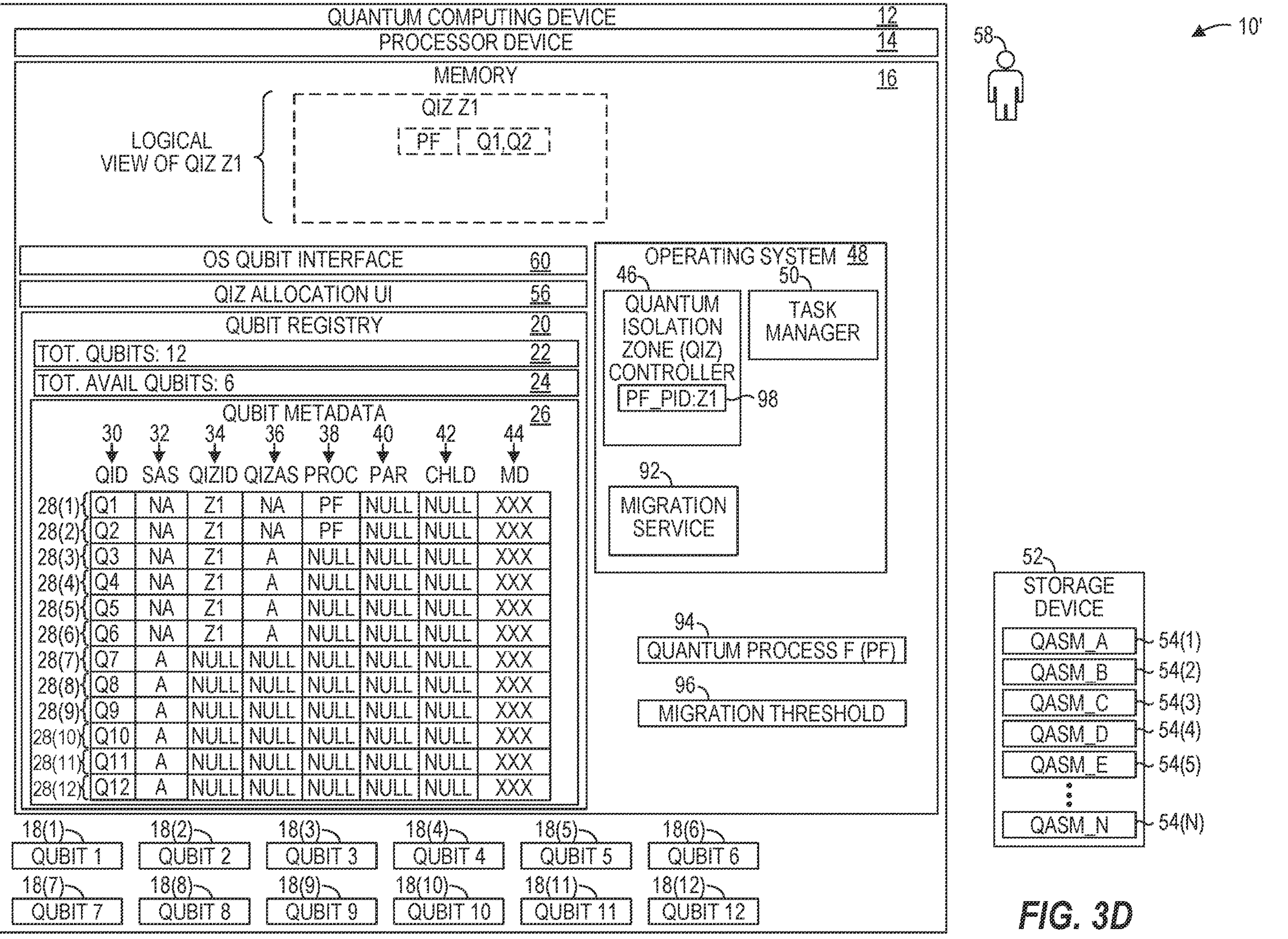

According to some examples such as the example illustrated in FIG. 3D, the migration service 92 may transfer the qubits 18(7) and 18(8) to the QIZ Z1 by allocating qubits already associated with the QIZ Z1 to the quantum process 94, and copying data values (not shown) of the qubits 18(7) and 18(8) into the newly allocated qubits. In such examples, the migration service 92 (beginning with the environment 10' as shown in FIG. 3A and transitioning to the state shown in FIG. 3D) selects the qubits 18(1) and 18(2) from among the available qubits 18(1)-18(6) of the QIZ Z1. This may be accomplished by the migration service 92 requesting allocation of two (2) qubits in the QIZ Z1 from the QIZ controller 46, which receives the request, determines that the qubits 18(1) and 18(2) are available for allocation within the QIZ Z1, and modifies the QIZ availability status 36 of the metadata records 28(1)-28(2) (e.g., by setting the value to "NA") to indicate that the corresponding qubits 18(1)-18(2) have been allocated and thus are no longer available for allocation. The migration service 92 may then allocate the qubits 18(1) and 18(2) to the quantum process 94, copy respective data values (not shown) from the qubits 18(7) and 18(8) to the qubits 18(2) and 18(2), and associate the quantum process 94 with the QIZ Z1 in a manner similar to that discussed above with respect to FIGS. 3B and 3C.

Figure 3E:
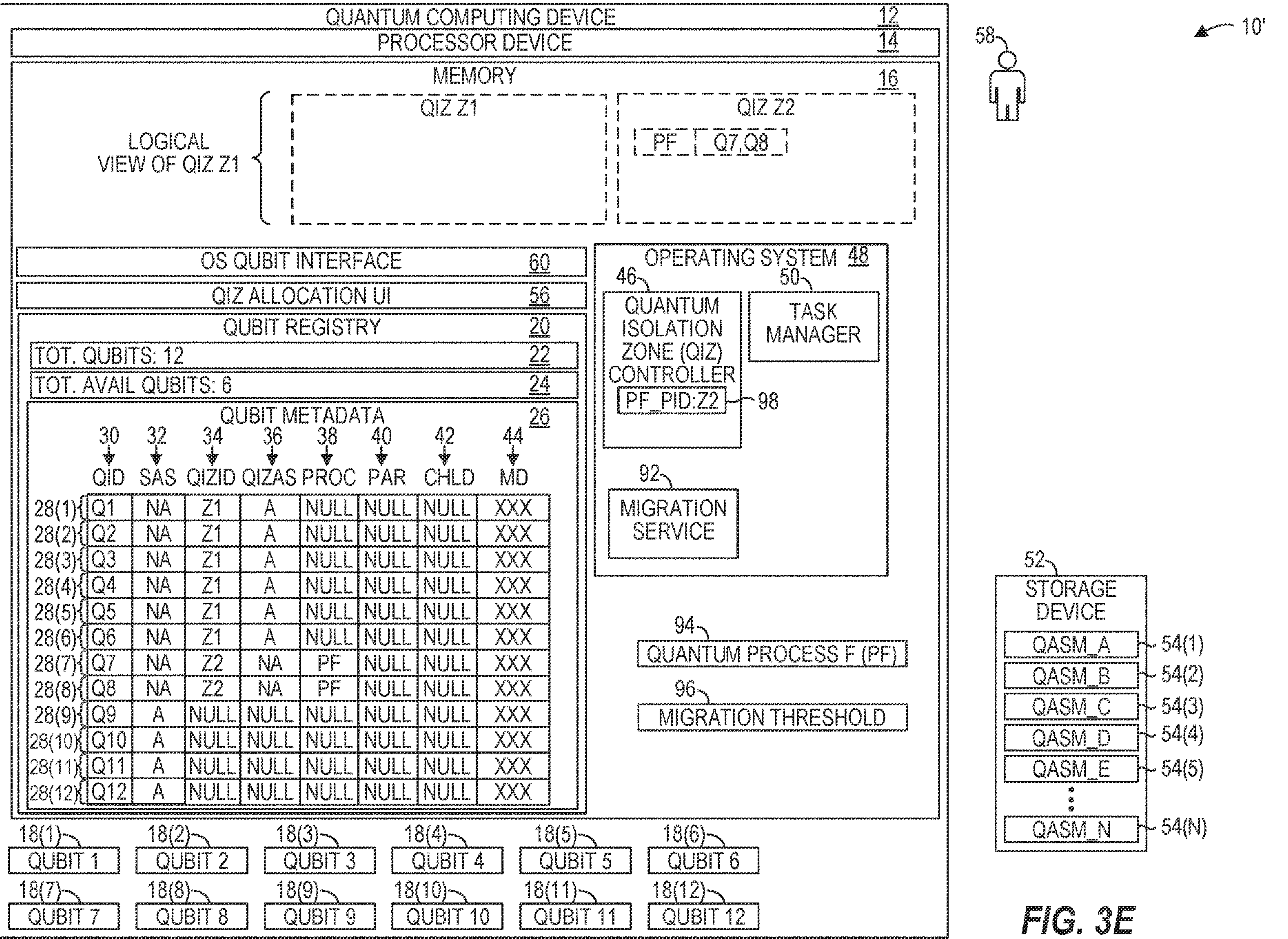

As noted above, FIGS. 3E-3H correspond to FIGS. 3A-3D, but illustrate changes to the environment 10' by the migration service 92 operating on a quantum process that is currently executing and that is associated with a QIZ. Thus, as seen in FIG. 3E, the environment 10' is in a state corresponding to that of the environment 10 of FIG. 1B, in that the QIZ Z1 has been established and the qubits 18(1)-18(6) have been allocated to the QIZ Z1. In addition, the QIZ Z2 has also been established, with the qubits 18(7) and 18(8) allocated to the QIZ Z2. The quantum computing device 12 in the example of FIGS. 3E-3H is currently executing the quantum process 94 using the qubits 18(7) and 18(8), as shown by the metadata records 28(7) and 28(8), and the quantum process 94 is associated with the QIZ Z2, as shown by the mapping record 98.

Figure 3F:
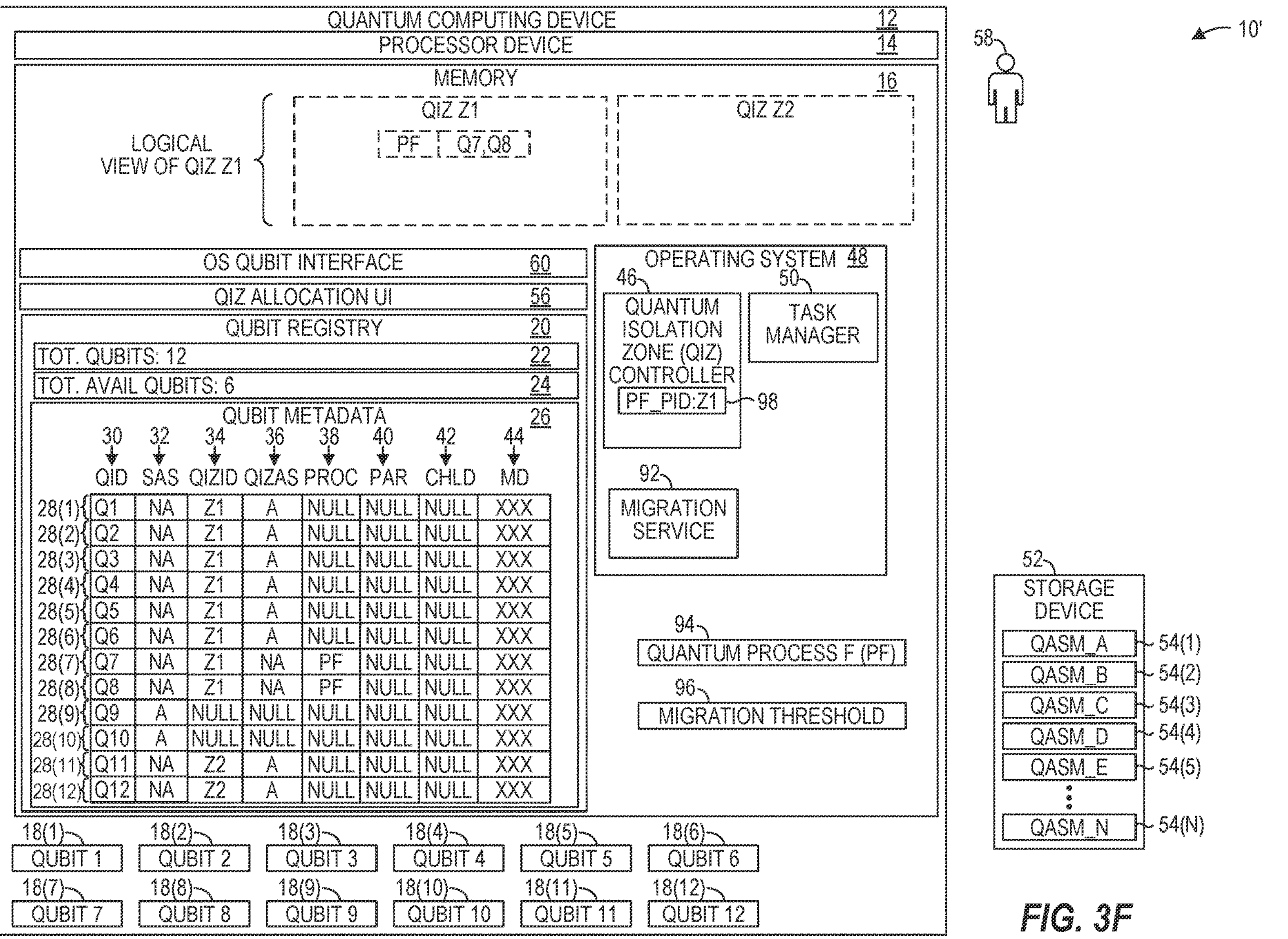

FIG. 3F illustrates the effect of operations performed by the migration service 92 for transferring the qubits 18(7) and 18(8) to the QIZ Z1 by associating the qubits 18(7) and 18(8) with the QIZ Z1, such that the qubits 18(7) and 18(8) become part of the plurality of qubits to which the control and isolation features provided by the QIZ Z1 apply. In some examples, the migration service 92 may send a request to the QIZ controller 46 to update the metadata records 28(7) and 28(8) corresponding to the qubits 18(7) and 18(8) to modify the QIZID 34 to indicate that the corresponding qubits 18(7) and 18(8) are no longer associated with the QIZ Z2, and are now associated with the QIZ Z1. The QIZ controller 46 may also modify the QIZ availability status 36 to indicate that the corresponding qubits 18(7) and 18(8) are no longer available for allocation (e.g., "NA"). The migration service 92 may also associate the quantum process 94 with the QIZ Z1 by sending a request to the QIZ controller 46 to update the mapping record 98 to map the PF_PID to the QIZ Z1. The quantum process 94 is now said to "execute in" or be "associated with" the QIZ Z1, because the visibility of and access to the qubits 18(7) and 18(8) is now constrained by the QIZ Z1.

After the migration service 92 associates the qubits 18(7) and 18(8) with the QIZ Z1, the QIZ Z2 may suffer from a deficiency of qubits. Accordingly, the migration service 92 in some examples may subsequently select qubits, such as the qubits 18(11) and 18(12) of the qubits 18(1)-18(12) implemented by the quantum computing device 12, to replenish the qubits of the QIZ Z2. The migration service 92 may then associate the selected qubits 18(11) and 18(12) with the second QIZ Z2, as seen in FIG. 3F.

Figure 3G:
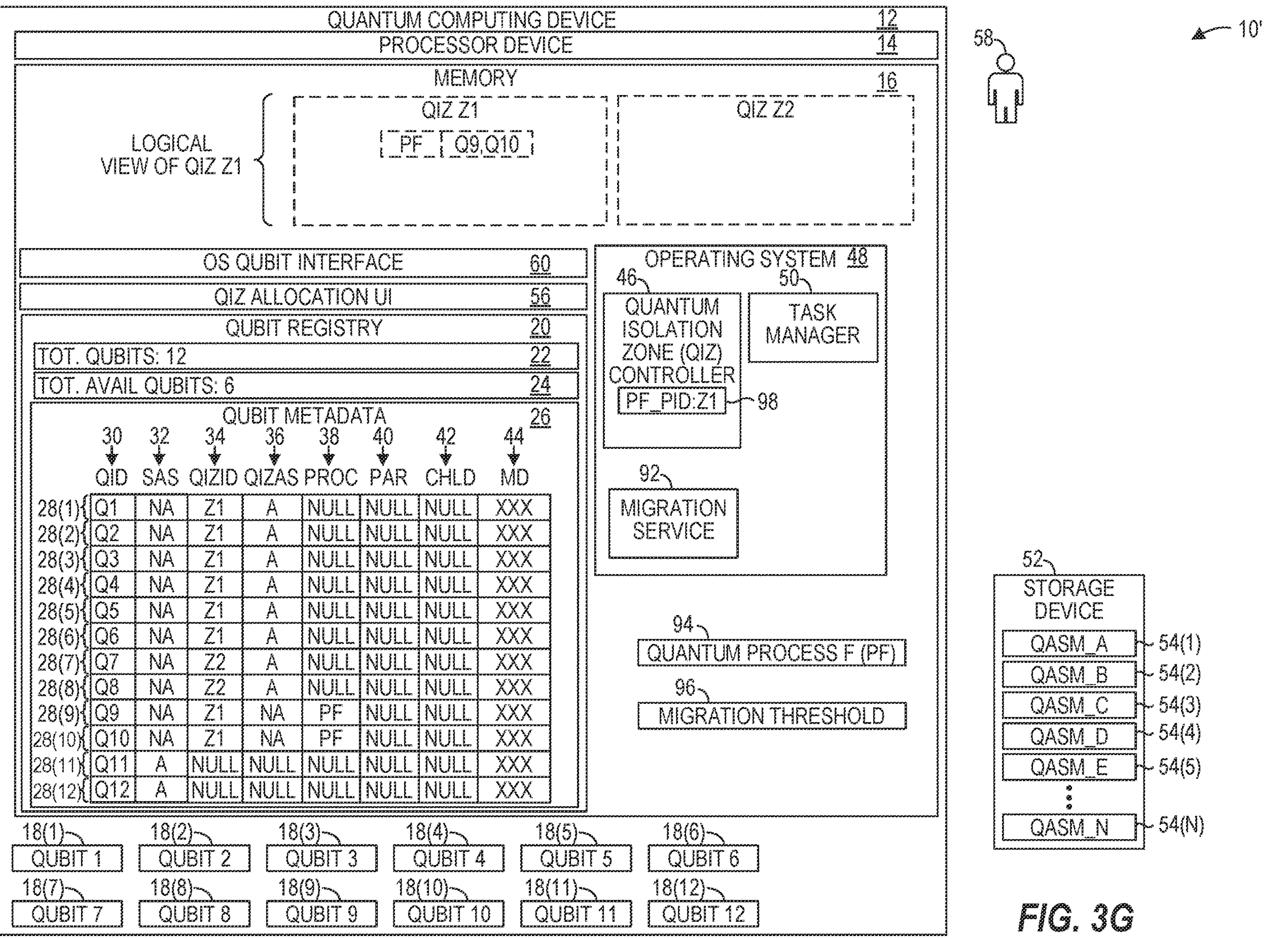

In FIG. 3G, the effects of operations performed by the migration service 92 for transferring the qubits 18(7) and 18(8) to the QIZ Z1 by adding new qubits to the QIZ Z1 and copying data values (not shown) of the qubits 18(7) and 18(8) of the QIZ Z2 into the new qubits is shown. In such examples, the migration service 92 (beginning with the environment 10' as shown in FIG. 3E and transitioning to the state shown in FIG. 3G) selects qubits 18(9) and 18(10) from the plurality of available qubits 18 implemented by the quantum computing device 12 by sending a request to the QIZ controller 46 to allocate two (2) qubits 18. The QIZ controller 46 accesses the qubit metadata 26 and identifies two (2) qubits 18 that have a system availability status 32 that indicates the qubits 18 are available. The QIZ controller 46 determines that the two (2) qubits 18(9) and 18(10) are available based on the system availability status 32 of the metadata records 28(9)-28(10). The QIZ controller 46 then modifies the QIZID 34 to indicate that the corresponding qubits 18(9) and 18(10) are now associated with the QIZ Z1, and modifies the system availability status 32 of the metadata records 28(9)-28(10) (e.g., by setting the value to "NA") to indicate that the two (2) qubits 18(9)-18(10) are no longer available for allocation.

The migration service 92 next allocates the qubits 18(9) and 18(10) to the quantum process 94 by, e.g., requesting that the QIZ controller 46 modify the QIZ availability status 36 of the metadata records 28(9) and 28(10) to indicate that the corresponding qubits 18(9) and 18(10) have been allocated to the quantum process 94 and thus are no longer available for allocation (e.g., to the value "NA"). The migration service 92 also copies respective data values (not shown) from the qubits 18(7) and 18(8) to the newly allocated qubits 18(9) and 18(10). The migration service 92 further requests that the QIZ controller 46 modify the QIZ availability status 36 of the metadata records 28(7) and 28(8) to indicate that the corresponding qubits 18(7) and 18(8) are now available for allocation (e.g., to the value "A"), and also to modify the process identifier 38 of metadata records 28(7) and 28(8) to "NULL" to indicate that the corresponding qubits 18(7) and 18(8) are no longer allocated to the quantum process 94. Finally, the migration service 92 associates the quantum process 94 with the QIZ Z1 in a manner similar to that discussed above with respect to FIG. 3F, which results in the quantum process 94 continuing execution using the qubits 18(9) and 18(10).

Figure 3H:
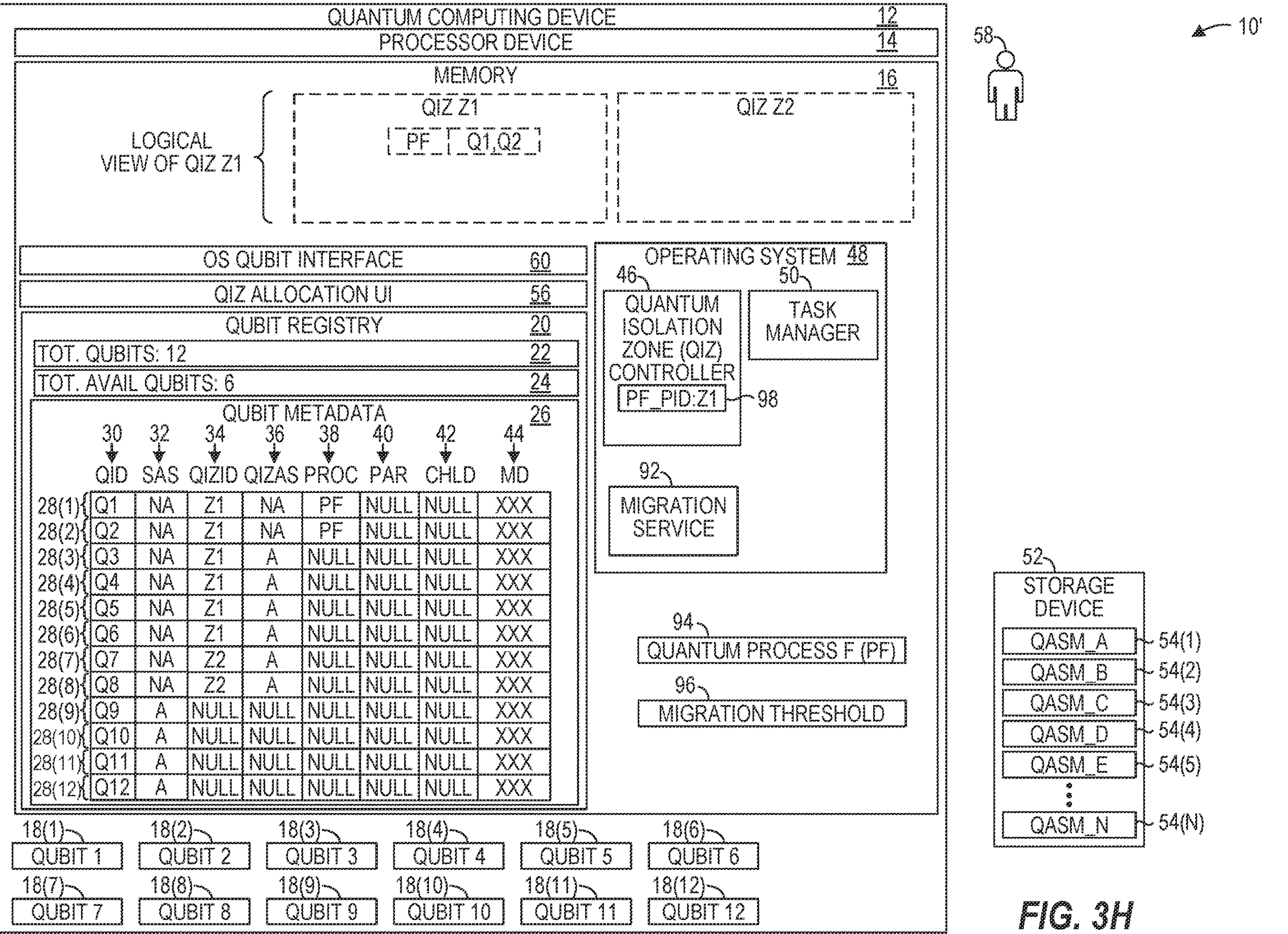

FIG. 3H illustrates the effects of operations performed by the migration service 92 for transferring the qubits 18(7) and 18(8) to the QIZ Z1 by allocating qubits already associated with the QIZ Z1 to the quantum process 94, and copying data values (not shown) of the qubits 18(7) and 18(8) into the newly allocated qubits. In such examples, the migration service 92 (beginning with the environment 10' as shown in FIG. 3E and transitioning to the state shown in FIG. 3H) selects the qubits 18(1) and 18(2) from among the available qubits 18(1)-18(6) of the QIZ Z1. This may be accomplished by the migration service 92 requesting allocation of two (2) qubits in the QIZ Z1 from the QIZ controller 46, which receives the request, determines that the qubits 18(1) and 18(2) are available for allocation within the QIZ Z1, and modifies the QIZ availability status 36 of the metadata records 28(1)-28(2) (e.g., by setting the value to "NA") to indicate that the corresponding qubits 18(1)-18(2) has been allocated and thus is no longer available for allocation. The migration service 92 may then allocate the qubits 18(1) and 18(2) to the quantum process 94, copy respective data values (not shown) from the qubits 18(7) and 18(8) to the qubits 18(1) and 18(2), deallocate the qubits 18(7) and 18(8) from the quantum process 94, and associate the quantum process 94 with the QIZ Z1 in a manner similar to that discussed above with respect to FIGS. 3F and 3G.

It is to be understood that, because the migration service 92 is a component of the quantum computing device 12, functionality implemented by the migration service 92 may be attributed to the quantum computing device 12 generally. Moreover, in examples where the migration service 92 comprises software instructions that program the processor device 14 to carry out functionality discussed herein, functionality implemented by the migration service 92 may be attributed herein to the processor device 14. It is to be further understood that while, for purposes of illustration only, the migration service 92 is depicted as a single component, the functionality implemented by the migration service 92 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

FIGS. 4A-4D provide a flowchart 100 to illustrate exemplary operations performed by the quantum computing device 12 of FIGS. 1A-1F and 3A-3H for migrating executing quantum processes into QIZs according to one example. Elements of FIGS. 1A-1F and 3A-3H are referenced in describing FIGS. 4A-4D for the sake of clarity. It is to be understood that, in some examples, some operations illustrated in FIGS. 4A-4D may be performed in an order other than illustrated herein, and/or may be omitted.

Figure 4A:
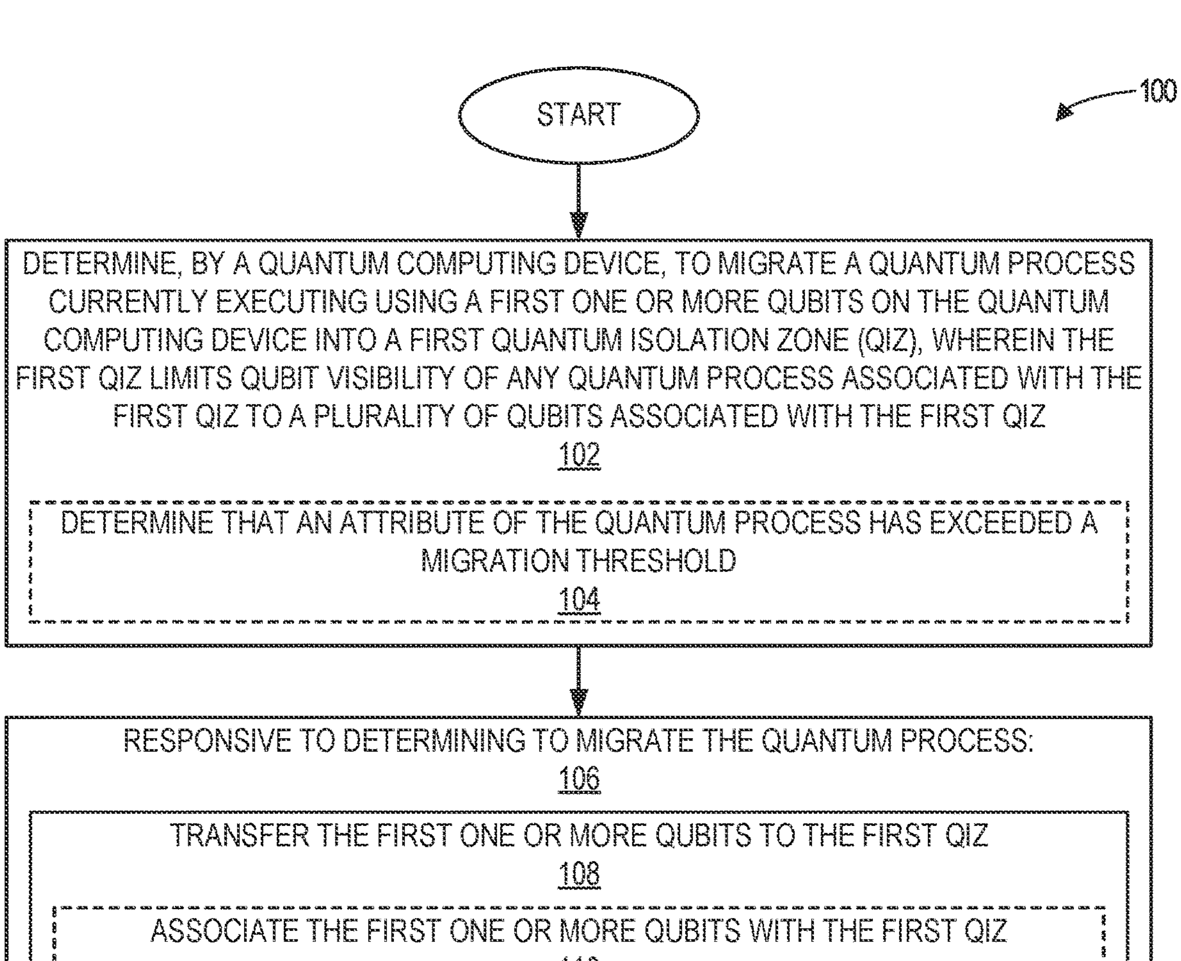
FIGS. 4A-4D are flowcharts illustrating operations performed by the quantum computing system of FIGS. 3A-3H for migrating executing quantum processes into QIZs, according to one example.

In FIG. 4A, operations in some examples begin with the processor device 14 of the quantum computing device 12 (e.g., using the migration service 92) determining to migrate a quantum process (e.g., the quantum process 94 of FIGS. 3A-3H) currently executing using a first one or more qubits (e.g., the qubits 18(7) and 18(8) of FIGS. 3A-3H) on the quantum computing device 12 into a first QIZ (e.g., the QIZ Z1), wherein the first QIZ Z1 limits qubit visibility of any quantum process associated with the first QIZ Z1 to a plurality of qubits 18(1)-18(6) associated with the first QIZ Z1 (block 102). In some examples, the operations of block 102 for determining to migrate the quantum process 94 may comprise determining that an attribute of the quantum process 94 has exceeded a migration threshold, such as the migration threshold 96 of FIGS. 3A-3H (block 104).

Responsive to determining to migrate the quantum process 94, the migration service 92 performs a series of operations (block 106). The migration service 92 transfers the first one or more qubits 18(7) and 18(8) to the first QIZ Z1 (block 108). In some examples, the operations of block 108 for transferring the first one or more qubits 18(7) and 18(8) to the first QIZ Z1 may comprise associating the first one or more qubits 18(7) and 18(8) with the first QIZ Z1 (block 110). Some examples may provide that the operations of block 110 for associating the first one or more qubits 18(7) and 18(8) with the first QIZ Z1 may comprise modifying qubit metadata, such as the metadata records 28(7) and 28(8), for the first one or more qubits 18(7) and 18(8) to indicate that each qubit of the first one or more qubits 18(7) and 18(8) is associated with the first QIZ Z1 (block 112). Operations in some examples may continue at block 114 in FIG. 4B.

Figure 4B:
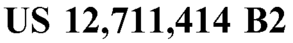
Figure 4B:
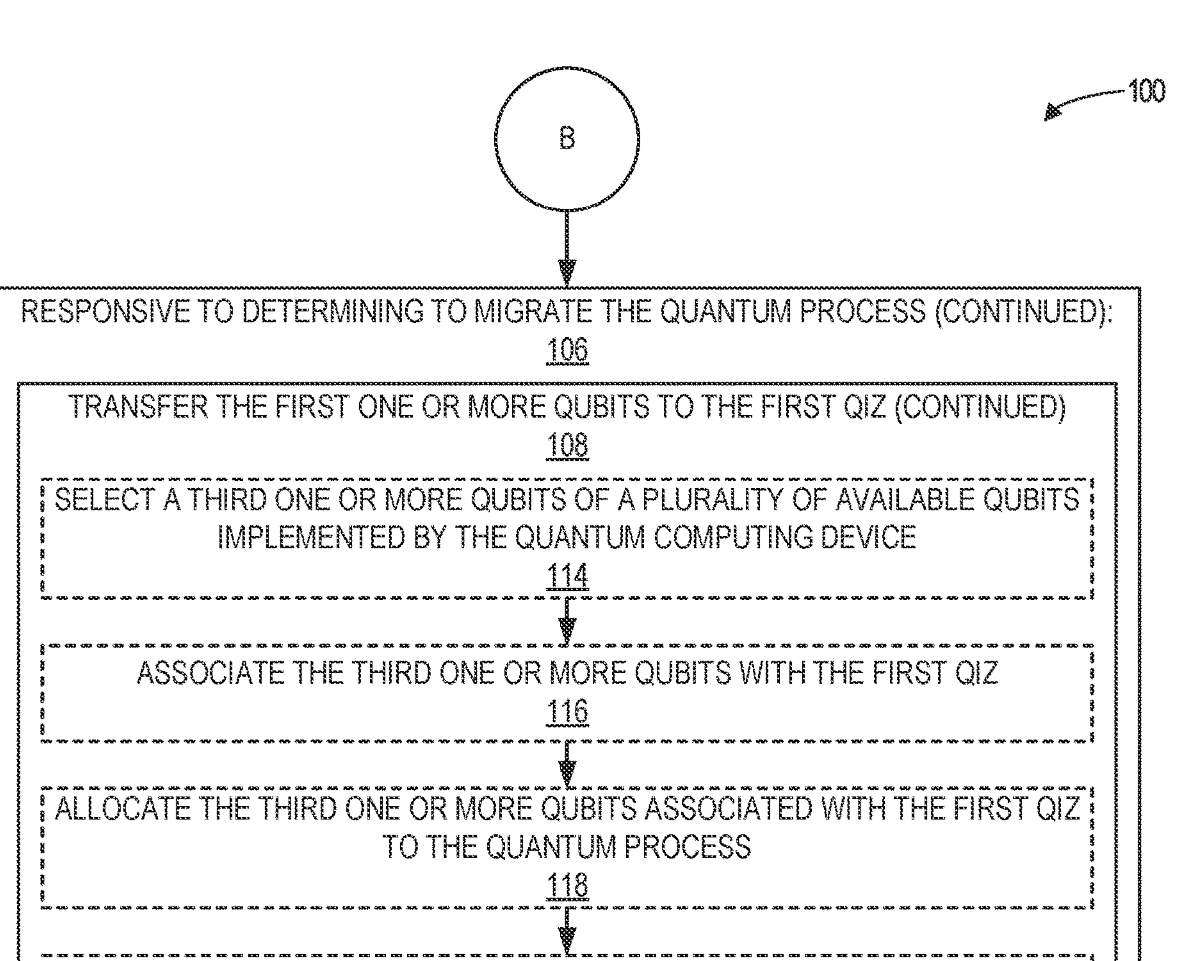

Referring now to FIG. 4B, some examples may provide that the operations of block 108 for transferring the first one or more qubits 18(7) and 18(8) to the first QIZ Z1 may comprise the migration service 92 selecting a third one or more qubits (e.g., the qubits 18(9) and 18(10) of FIGS. 3A-3H) of the plurality of available qubits 18(1)-18(12) implemented by the quantum computing device 12 (block 114). The migration service 92 associates the third one or more qubits 18(9) and 18(10) with the first QIZ Z1 (block 116). The migration service 92 also allocates the third one or more qubits 18(9) and 18(10) associated with the first QIZ Z1 to the quantum process 94 (block 118). The migration service 92 then copies respective data values from the first one or more qubits 18(7) and 18(8) to the third one or more qubits 18(9) and 18(10) (block 120). In some examples, operations may continue at block 122 in FIG. 4C.

Figure 4C:
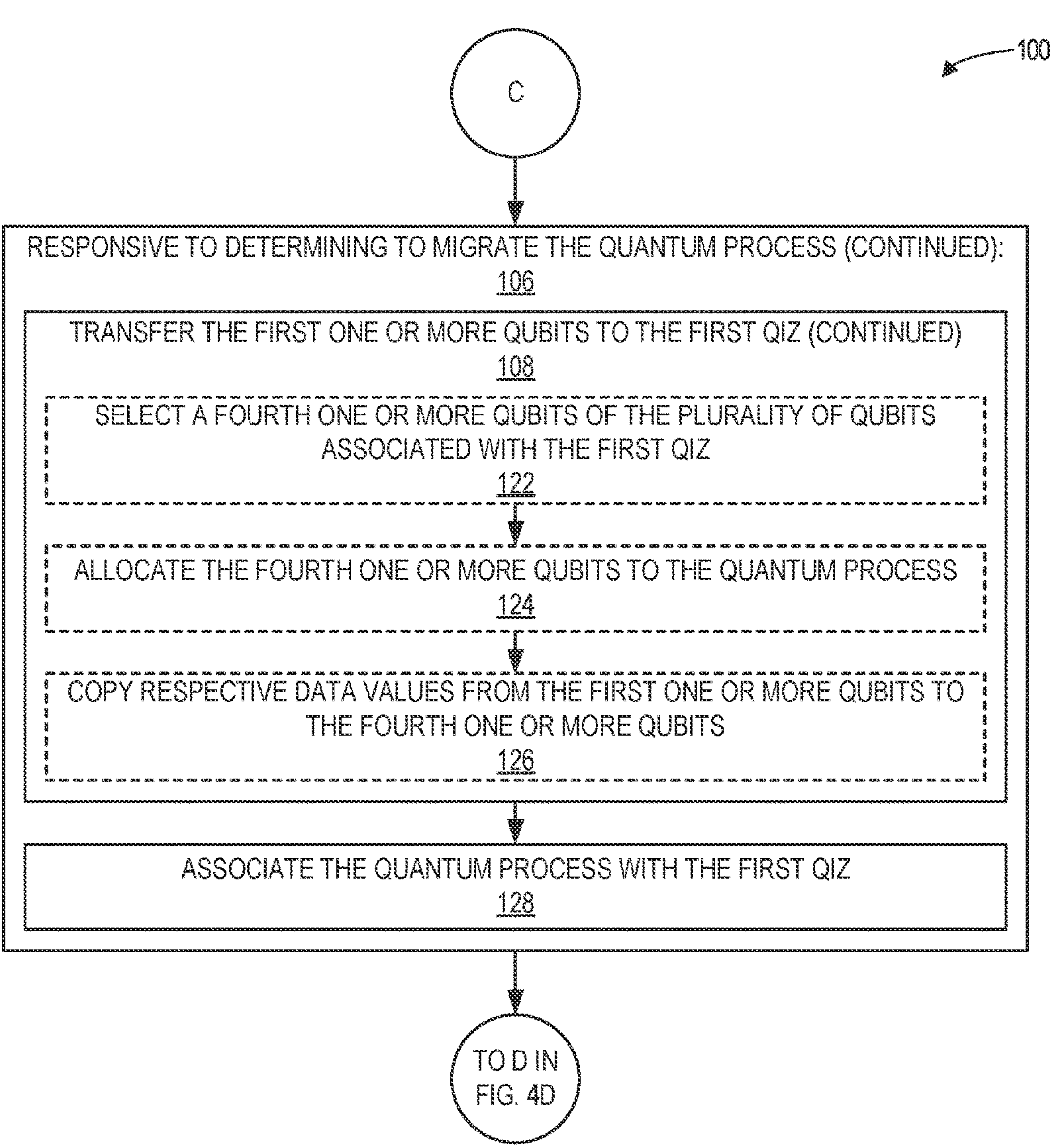

Turning now to FIG. 4C, some examples may provide that the operations of block 108 for transferring the first one or more qubits 18(7) and 18(8) to the first QIZ Z1 may comprise the migration service 92 selecting a fourth one or more qubits (e.g., the qubits 18(1) and 18(2) of FIGS. 3A-3H) of the plurality of qubits 18(1)-18(6) associated with the first QIZ Z1 (block 122). The migration service 92 allocates the fourth one or more qubits 18(1) and 18(2) to the quantum process 94 (block 124). The migration service 92 then copies respective data values from the first one or more qubits 18(7) and 18(8) to the fourth one or more qubits 18(1) and 18(2) (block 126). After transferring the first one or more qubits 18(7) and 18(8) to the first QIZ Z1, the migration service 92 associates the quantum process 94 with the first QIZ Z1 (block 128). Operations then continue at block 130 of FIG. 4D.

Figure 4D:
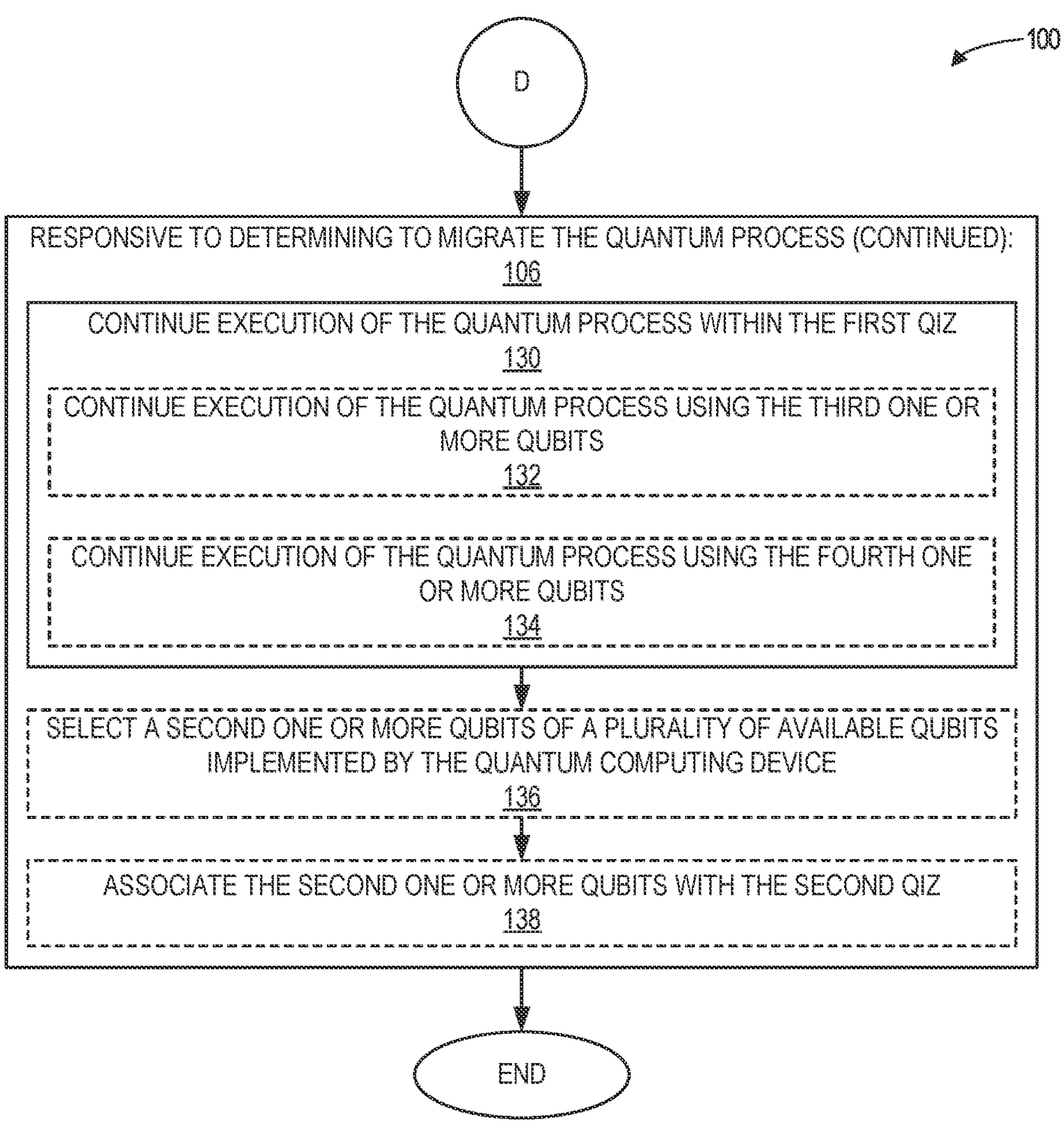

With reference now to FIG. 4D, the quantum computing device 12 continues execution of the quantum process 94 within the first QIZ Z1 (block 130). In some examples in which the contents of the first one or more qubits 18(7) and 18(8) are copied into the third one or more qubits 18(9) and 18(10), the operations of block 130 for continuing execution of the quantum process 94 within the first QIZ Z1 may comprise continuing execution of the quantum process 94 using the third one or more qubits 18(9) and 18(10) (block 132). Similarly, in examples in which the contents of the first one or more qubits 18(7) and 18(8) are copied into the fourth one or more qubits 18(1) and 18(2), the operations of block 130 for continuing execution of the quantum process 94 within the first QIZ Z1 may comprise continuing execution of the quantum process 94 using the fourth one or more qubits 18(1) and 18(2) (block 134).

Some examples in which in the first one or more qubits 18(7) and 18(8) are first associated with the second QIZ Z2 and are subsequently associated with the first QIZ Z1 may provide that the migration service 92 subsequently selects a second one or more qubits (e.g., the qubits 18(11) and 18(12) of FIGS. 3A-3H) of the plurality of available qubits 18(1)-18(12) implemented by the quantum computing device 12 (block 136). The migration service 92 then associates the second one or more qubits 18(11) and 18(12) with the second QIZ Z2 (block 138).

Figure 5:
FIG. 5 is a simpler block diagram of the quantum computing system of FIGS. 3A-3H for migrating executing quantum processes into QIZs, according to one example.
Figure 5:
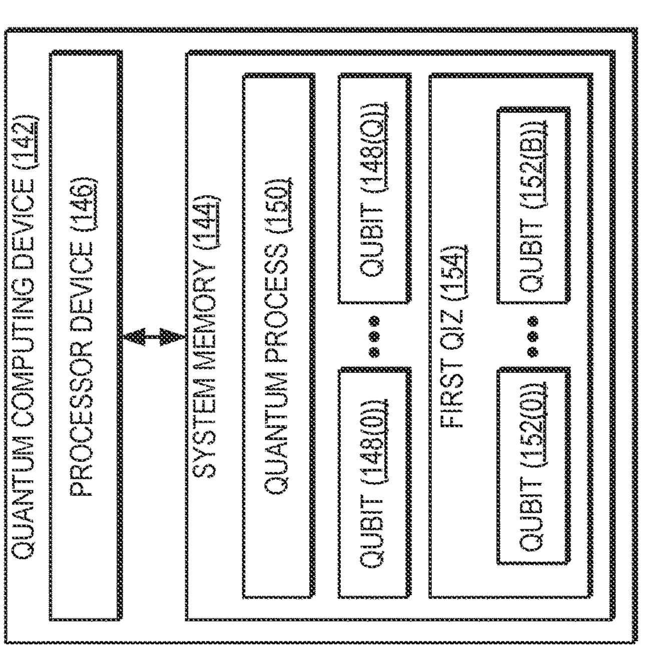

FIG. 5 is a simpler block diagram of the environment 10' of FIGS. 3A-3H for migrating executing quantum processes into QIZs, according to one example. In the example of FIG. 5, a quantum computing system 140 includes a quantum computing device 142 that comprises a system memory 144 and a processor device 146. The quantum computing device 142 implements a first one or more qubits 148(0)-148(Q) (generally referred to herein as "qubits 148") that are associated with a quantum process 150, as well as a plurality of qubits 152(0)-152(B) that are associated with a first QIZ 154. In exemplary operation, the processor device 146 of the quantum computing device 142 determines to migrate the quantum process 150 currently executing using the first one or more qubits 148(0)-148(Q) on the quantum computing device 142 into the first QIZ 154, wherein the first QIZ 154 limits qubit visibility of any quantum process associated with the first QIZ 154 to a plurality of qubits 152(0)-152(B) associated with the first QIZ 154. In response to the determining, the processor device 146 transfers the first one or more qubits 148(0)-148(Q) to the first QIZ 154, and associates the quantum process 150 with the first QIZ 154. The quantum computing device 142 then continues execution of the quantum process 150 within the first QIZ 154.

Figure 6:
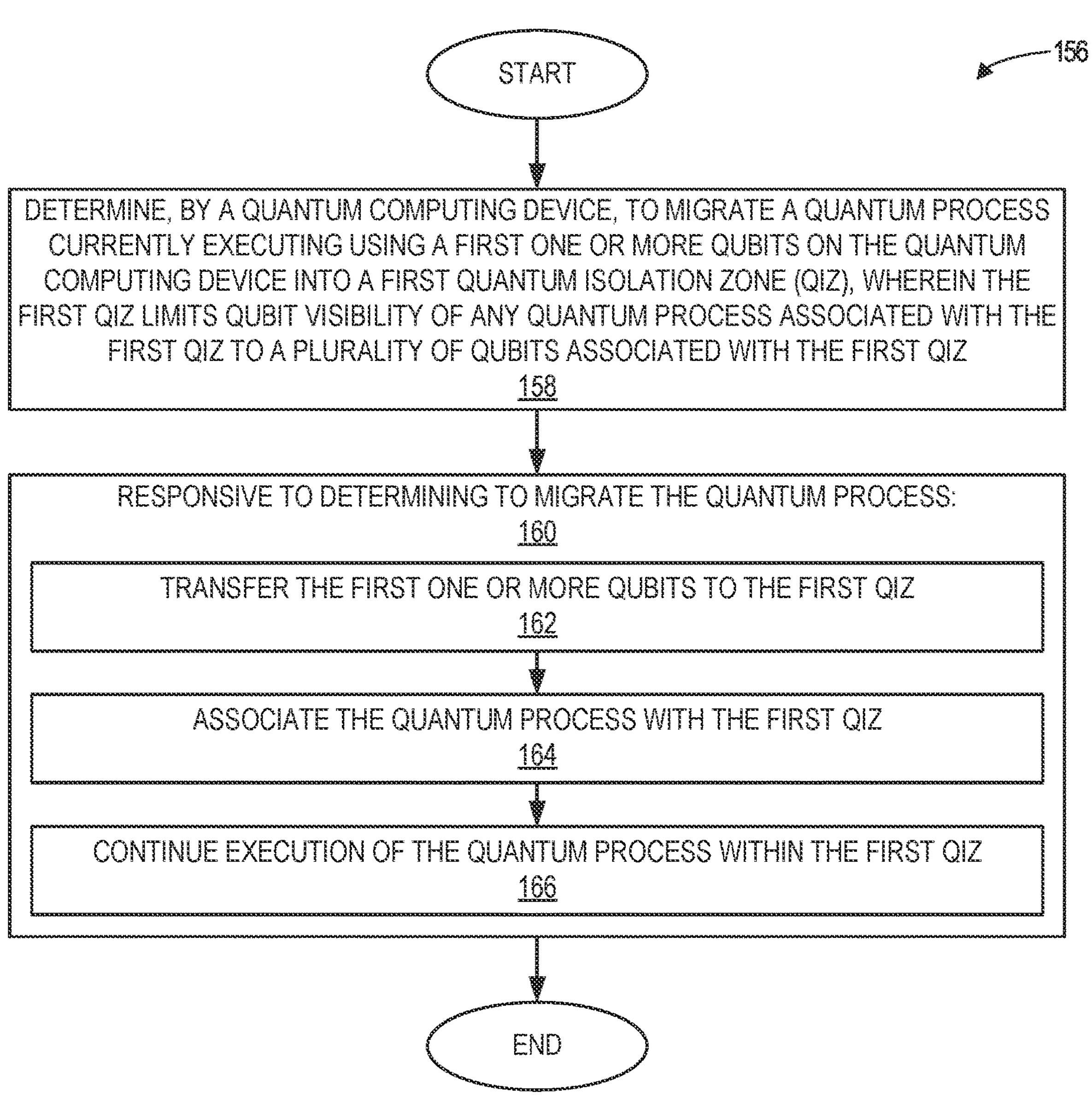
FIG. 6 is a flowchart of a simplified method for migrating executing quantum processes into QIZs by the quantum computing device of FIG. 5, according to one example.

To illustrate a simplified method for migrating executing quantum processes into QIZs in the quantum computing system 140 of FIG. 5 according to one example, FIG. 6 provides a flowchart 156. Elements of FIG. 5 are referenced in describing FIG. 6 for the sake of clarity. In FIG. 6, operations begin with the processor device 146 of the quantum computing device 142 determining to migrate the quantum process 150 currently executing using the first one or more qubits 148 on the quantum computing device 142 into the first QIZ 154, wherein the first QIZ 154 limits qubit visibility of any quantum process associated with the first QIZ 154 to a plurality of qubits associated with the first QIZ 154 (block 158). The processor device 146 then performs a series of operations responsive to determining to migrate the quantum process 150 (block 160). The processor device 146 first transfers the first one or more qubits 148 to the first QIZ 154 (block 162). The processor device 146 next associates the quantum process 150 with the first QIZ 154 (block 164). The processor device 146 then continues execution of the quantum process 150 within the first QIZ 154 (block 166).

Figure 7:
FIG. 7 is a block diagram of a quantum computing device suitable for implementing examples.
Figure 7:
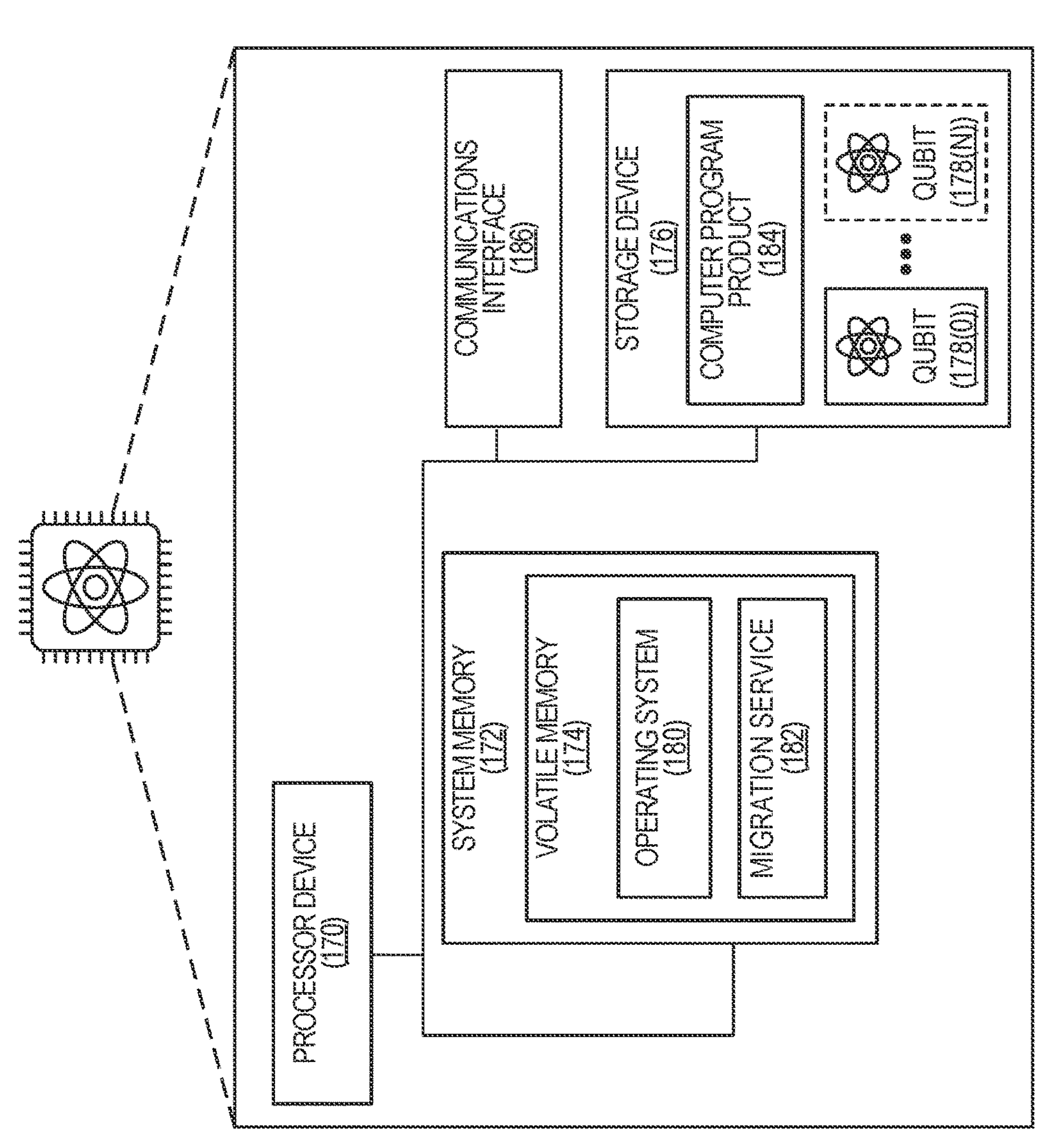

FIG. 7 is a block diagram of a quantum computing device 168, such as the quantum computing device 12 of FIG. 1, suitable for implementing examples according to one example. The quantum computing device 168 may comprise any suitable quantum computing device or devices. The quantum computing device 168 can operate using classical computing principles or quantum computing principles. When using quantum computing principles, the quantum computing device 168 performs computations that utilize quantum-mechanical phenomena, such as superposition and entanglement. The quantum computing device 168 may operate under certain environmental conditions, such as at or near zero degrees (0°) Kelvin. When using classical computing principles, the quantum computing device 168 utilizes binary digits that have a value of either zero (0) or one (1).

The quantum computing device 168 includes a processor device 170 and a system memory 172. The processor device 170 can be any commercially available or proprietary processor suitable for operating in a quantum environment. The system memory 172 may include volatile memory 174 (e.g., random-access memory (RAM)). The quantum computing device 168 may further include or be coupled to a non-transitory computer-readable medium such as a storage device 176. The storage device 176 and other drives associated with computer-readable media and computer-usable media may provide non-volatile storage of data, data structures, computer-executable instructions, and the like. The storage device may also provide functionality for storing one or more qubits 178(0)-178(N).

A number of modules can be stored in the storage device 176 and in the volatile memory 174, including an operating system 180 and one or more modules, such as a migration service 182. All or a portion of the examples may be implemented as a computer program product 184 stored on a transitory or non-transitory computer-usable or computer-readable medium, such as the storage device 176, which includes complex programming instructions, such as complex computer-readable program code, to cause the processor device 170 to carry out the steps described herein. Thus, the computer-readable program code can comprise computer-executable instructions for implementing the functionality of the examples described herein when executed on the processor device 170.

An operator may also be able to enter one or more configuration commands through a keyboard (not illustrated), a pointing device such as a mouse (not illustrated), or a touch-sensitive surface such as a display device (not illustrated). The quantum computing device 168 may also include a communications interface 186 suitable for communicating with other quantum computing systems, including, in some examples, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:

determining, by a quantum computing device, to migrate a quantum process currently executing using a first one or more qubits on the quantum computing device into a first quantum isolation zone (QIZ), wherein the first QIZ limits qubit visibility of any quantum process associated with the first QIZ to a plurality of qubits associated with the first QIZ, and wherein qubit metadata that correspond to the first one or more qubits identify the one or more qubits as not being associated with the first QIZ; and responsive to determining to migrate the quantum process:

transferring the first one or more qubits to the first QIZ;

modifying the qubit metadata to identify the one or more qubits as being associated with the first QIZ;

associating the quantum process with the first QIZ, wherein associating the quantum process with the first QIZ comprises generating a mapping record that identifies a program identifier of the quantum process as being associated with the first QIZ; and
continuing execution of the quantum process within the first QIZ.

2. The method of claim 1, wherein:
determining to migrate the quantum process into the first QIZ comprises determining that an attribute of the quantum process has exceeded a migration threshold; and
the attribute comprises a response time of the quantum process, an execution time of the quantum process, a noise tolerance of the quantum process, or a contention tolerance of the quantum process.

3. The method of claim 1, wherein transferring the first one or more qubits to the first QIZ comprises associating the first one or more qubits with the first QIZ.

4. The method of claim 3, wherein:
the first one or more qubits are associated with a second QIZ prior to transferring the first one or more qubits to the first QIZ; and
the method further comprises:
selecting a second one or more qubits of a plurality of available qubits implemented by the quantum computing device; and
associating the second one or more qubits with the second QIZ.

5. The method of claim 1, wherein:
transferring the first one or more qubits to the first QIZ comprises:
selecting a third one or more qubits of a plurality of available qubits implemented by the quantum computing device;
associating the third one or more qubits with the first QIZ;
allocating the third one or more qubits associated with the first QIZ to the quantum process; and
copying respective data values from the first one or more qubits to the third one or more qubits; and
continuing execution of the quantum process within the first QIZ comprises continuing execution of the quantum process using the third one or more qubits.

6. The method of claim 1, wherein:
transferring the first one or more qubits to the first QIZ comprises:
selecting a fourth one or more qubits of the plurality of qubits associated with the first QIZ;
allocating the fourth one or more qubits to the quantum process; and
copying respective data values from the first one or more qubits to the fourth one or more qubits; and
continuing execution of the quantum process within the first QIZ comprises continuing execution of the quantum process using the fourth one or more qubits.

7. A quantum computing device comprising:
a system memory; and
a processor device communicatively coupled to the system memory, the processor device to:
determine to migrate a quantum process currently executing using a first one or more qubits on the quantum computing device into a first quantum isolation zone (QIZ), wherein the first QIZ limits qubit visibility of any quantum process associated with the first QIZ to a plurality of qubits associated with the first QIZ, and wherein qubit metadata that correspond to the first one or more qubits identify the one or more qubits as not being associated with the first QIZ; and
responsive to determining to migrate the quantum process:
transfer the first one or more qubits to the first QIZ;
modify the qubit metadata to identify the one or more qubits as being associated with the first QIZ;
associate the quantum process with the first QIZ, wherein associating the quantum process with the first QIZ comprises generating a mapping record that identifies a program identifier of the quantum process as being associated with the first QIZ; and
continue execution of the quantum process within the first QIZ.

8. The quantum computing device of claim 7, wherein:
to determine to migrate the quantum process into the first QIZ is to determine that an attribute of the quantum process has exceeded a migration threshold; and
the attribute comprises a response time of the quantum process, an execution time of the quantum process, a noise tolerance of the quantum process, or a contention tolerance of the quantum process.

9. The quantum computing device of claim 7, wherein to transfer the first one or more qubits to the first QIZ is to associate the first one or more qubits with the first QIZ.

10. The quantum computing device of claim 9, wherein:
the first one or more qubits are associated with a second QIZ prior to transferring the first one or more qubits to the first QIZ; and
the processor device is further to:
select a second one or more qubits of a plurality of available qubits implemented by the quantum computing device; and
associate the second one or more qubits with the second QIZ.

11. The quantum computing device of claim 7, wherein:
to transfer the first one or more qubits to the first QIZ is to:
select a third one or more qubits of a plurality of available qubits implemented by the quantum computing device;
associate the third one or more qubits with the first QIZ;
allocate the third one or more qubits associated with the first QIZ to the quantum process; and
copy respective data values from the first one or more qubits to the third one or more qubits; and
to continue execution of the quantum process within the first QIZ is to continue execution of the quantum process using the third one or more qubits.

12. The quantum computing device of claim 7, wherein:
to transfer the first one or more qubits to the first QIZ is to:
select a fourth one or more qubits of the plurality of qubits associated with the first QIZ;
allocate the fourth one or more qubits to the quantum process;
copy respective data values from the first one or more qubits to the fourth one or more qubits; and
to continue execution of the quantum process within the first QIZ is to continue execution of the quantum process using the fourth one or more qubits.

13. A non-transitory computer-readable medium having stored thereon computer-executable instructions that, when executed, cause one or more processor devices to:
determine to migrate a quantum process currently executing using a first one or more qubits on a quantum computing device into a first quantum isolation zone (QIZ), wherein the first QIZ limits qubit visibility of any quantum process associated with the first QIZ to a plurality of qubits associated with the first QIZ, and wherein qubit metadata that correspond to the first one or more qubits identify the one or more qubits as not being associated with the first QIZ; and responsive to determining to migrate the quantum process:

transfer the first one or more qubits to the first QIZ;

modify the qubit metadata to identify the one or more qubits as being associated with the first QIZ:

associate the quantum process with the first QIZ, wherein associating the quantum process with the first QIZ comprises generating a mapping record that identifies a program identifier of the quantum process as being associated with the first QIZ; and continue execution of the quantum process within the first QIZ.

14. The non-transitory computer-readable medium of claim 13, wherein to transfer the first one or more qubits to the first QIZ is to associate the first one or more qubits with the first QIZ.

15. The non-transitory computer-readable medium of claim 14, wherein:

the first one or more qubits are associated with a second QIZ prior to transferring the first one or more qubits to the first QIZ; and the computer-executable instructions further cause the one or more processors to:

select a second one or more qubits of a plurality of available qubits implemented by the quantum computing device; and associate the second one or more qubits with the second QIZ.

16. The non-transitory computer-readable medium of claim 13, wherein:

to transfer the first one or more qubits to the first QIZ is to:

select a third one or more qubits of a plurality of available qubits implemented by the quantum computing device;

associate the third one or more qubits with the first QIZ;

allocate the third one or more qubits associated with the first QIZ to the quantum process; and copy respective data values from the first one or more qubits to the third one or more qubits; and to continue execution of the quantum process within the first QIZ is to continue execution of the quantum process using the third one or more qubits.

17. The non-transitory computer-readable medium of claim 13, wherein:

to transfer the first one or more qubits to the first QIZ is to:

select a fourth one or more qubits of the plurality of qubits associated with the first QIZ;

allocate the fourth one or more qubits to the quantum process;

copy respective data values from the first one or more qubits to the fourth one or more qubits; and to continue execution of the quantum process within the first QIZ is to continue execution of the quantum process using the fourth one or more qubits.

* * * * *